United States Patent
Tonomura

(10) Patent No.: US 8,456,404 B2
(45) Date of Patent: Jun. 4, 2013

(54) VOLTAGE BOOSTING POWER SUPPLY CIRCUIT FOR MONITORING CHARGING VOLTAGE WITH PREDETERMINED VOLTAGE TO DETECT BOOSTED VOLTAGE, AND BOOSTED VOLTAGE CONTROL METHOD

(75) Inventor: Fumio Tonomura, Shiga (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1512 days.

(21) Appl. No.: 12/071,053

(22) Filed: Feb. 14, 2008

(65) Prior Publication Data
US 2008/0211979 A1    Sep. 4, 2008

(30) Foreign Application Priority Data

Mar. 1, 2007   (JP) .................................. 2007-051453
Jun. 27, 2007  (JP) .................................. 2007-169419

(51) Int. Cl.
G05F 3/08    (2006.01)

(52) U.S. Cl.
USPC .................. 345/98; 345/89; 345/204; 349/33

(58) Field of Classification Search
USPC ................................ 345/87–100, 204; 349/33
See application file for complete search history.

(56) References Cited

U.S. PATENT DOCUMENTS

2006/0274015 A1* 12/2006 Endo et al. ...................... 345/98
2006/0284806 A1* 12/2006 Maki .............................. 345/89
2008/0143697 A1*  6/2008 Kojima ......................... 345/204

FOREIGN PATENT DOCUMENTS

JP    2005-20922    1/2005
JP    2005-278383   10/2005

* cited by examiner

Primary Examiner — Amare Mengistu
Assistant Examiner — Jennifer Zubajlo
(74) Attorney, Agent, or Firm — McGinn IP Law Group, PLLC

(57) ABSTRACT

A power supply circuit of the present invention includes a voltage boosting capacitor, a first switch, a second switch, an addition comparison circuit, and a control circuit. The first switch charges the voltage boosting capacitor by applying a first voltage thereto. The second switch connects a second voltage serially to the voltage boosting capacitor that is already charged, thereby boosting the voltage therein. The addition comparison circuit adds up the voltage of the voltage boosting capacitor and the second voltage and compares the comparison result, with a predetermined threshold value. The control circuit controls the on/off state of the first switch according to the comparison result of the addition comparison circuit.

27 Claims, 22 Drawing Sheets

RELATED ART

RELATED ART

RELATED ART

RELATED ART

VOLTAGE BOOSTING POWER SUPPLY CIRCUIT FOR MONITORING CHARGING VOLTAGE WITH PREDETERMINED VOLTAGE TO DETECT BOOSTED VOLTAGE, AND BOOSTED VOLTAGE CONTROL METHOD

BACKGROUND OF THE INVENTION

1. Technical Field

The present invention relates to a voltage boosting power supply circuit and a boosted voltage control method, more particularly to a charge pump voltage boosting power supply circuit that employs a capacitor, as well as a boosted voltage control method.

2. Related Art

A charge pump power supply circuit is incorporated in each liquid crystal display panel driving IC (Integrated Circuit) employed for portable phones. This power supply circuit generates a panel driving voltage used for driving a liquid crystal display panel from a voltage (supply voltage) supplied from a battery or the like and supplies the generated voltage to the object driving IC. Many manufacturers are involved in portable phone markets and manufacturing various types of portable phones. Under such circumstances, such display panel driving ICs are required to have general-purpose properties and generate a predetermined driving voltage from any of various types of supply voltages without changing their settings.

Furthermore, such display panel driving ICs are also required to be reduced more in size to cope with liquid crystal display panels that are becoming narrower in frame width. And now that the picture quality is improved more and more due to an increase in the number of color tones, influences of the power supply circuit output voltage quality on picture quality cannot be ignored. This is why there has been a need of such a compact and high performance power supply circuit, that is, a compact power supply circuit that can prevent voltage falling to be caused by a load current. Consequently, chip sized and low voltage transistors favorable in performance have been used for those power supply circuits. The low voltage transistor has smaller on-resistance than the high voltage transistor when the same channel width is employed for both of the transistors. The use of such low voltage transistors, therefore, makes it possible to configure a low resistance switch smaller in size than a circuit that uses high voltage transistors.

Such a charge pump power supply circuit that generates a driving voltage from a supply voltage is disclosed in, for example, Japanese Patent Laid-Open Application No. 2005-20922. As shown in FIG. 1, this charge pump power supply circuit includes a voltage boosting circuit 790, a control circuit 780, a comparator 773, and a smoothing capacitor 799. The power supply circuit supplies an output voltage VDC 2 to a load circuit (not shown).

The voltage boosting circuit 790 includes transistors (switches) 791 to 794 and a voltage boosting capacitor 797. Each of the transistors 791 and 793 is a switch for applying a supply voltage VDC to the voltage boosting capacitor 797, thereby charging the capacitor 797. The transistor 792 is a switch for connecting the supply voltage VDC serially to the voltage boosting capacitor 797 that is already charged, thereby boosting the voltage of the capacitor 797. The transistor 794 is a switch for supplying a boosted voltage to the load circuit as a boosted output VDC 2.

The comparator 773 compares the charging voltage of the voltage boosting capacitor 797 with a reference voltage VR and outputs the comparison result to the control circuit 780. The control circuit 780 includes an AND circuit 781, a NAND circuit 782, and a NOT circuit 783. The control circuit 780 controls the on/off state of each of the transistors 791 to 794 of the voltage boosting circuit 790.

The output of the voltage boosting circuit 790 is smoothed by the smoothing capacitor 799 and the result is supplied to the load circuit. The smoothed output voltage VDC 2 is also supplied to the AND circuit 781, the NAND circuit 782, and the NOT circuit 783 of the control circuit 780, etc.

Next, there will be described the operation of this power supply circuit. A voltage Va of a node a is compared with the reference voltage VR in the comparator 773. The node a is connected to a terminal away far from the GND of the voltage boosting capacitor 797, the drain terminal of the transistor 793, and the source terminal of the transistor 794 respectively. The output of the comparator 773 becomes high when the voltage Va of the node a is lower than the reference voltage VR (Va<VR) and low when the voltage Va of the node a is higher than the reference voltage VR (Va≦VR).

When the level of the voltage boosting clock CLK is low, the gate level of each of the transistors 792 and 794 becomes high, so that those transistors are turned off. At this time, if the output level of the comparator 773 becomes high due to Va<VR, the level of the two inputs of the AND circuit 781 also becomes high. Consequently, the transistor 791 is turned on and the level of the two inputs of the NAND circuit 782 become high. Consequently, the transistor 793 is also turned on. At this time, the voltage Va of the node a is equal to the charging voltage VC of the voltage boosting capacitor 797. Thus the supply voltage VDC is applied to the voltage boosting capacitor 797, thereby the voltage boosting capacitor 797 is charged. In other words, while the level of the voltage boosting clock CLK is low and Va<VR is assumed, the voltage boosting capacitor 797 is kept charged in that period.

If the output level of the comparator 773 becomes low due to Va≧VR, that is, VC≦VR while the level of the voltage boosting clock CLK is low, the output of the AND 781 becomes low. As a result, the transistor 791 is turned off and the output level of the AND 782 becomes high, thereby the transistor 793 is also turned off. Consequently, the charging of the voltage boosting capacitor 797 stops. At this time, the voltage boosting capacitor 797 keeps the charging voltage as is without charging and discharging. The voltage boosting capacitor 797 is charged until the charging voltage VC becomes equal to the reference voltage VR.

When the level of the voltage boosting clock CLK is high, the level of the gates of the transistors 792 and 794 becomes low, so that those transistors 792 and 794 are turned on. At this time, the output level of the AND 781 becomes low, so that the transistor 791 is turned off and the output level of the NAND 782 becomes high, thereby the transistor 793 is turned off. Consequently, the connecting node between the voltage boosting capacitor 797 and the transistor 791 is applied the supply voltage VDC through the transistor 792 and the voltage Va of the node a is boosted to a value (VDC+VC) that is a sum of the supply voltage VDC and the charging voltage VC of the voltage boosting capacitor 797. This boosted voltage is supplied to the smoothing capacitor 799 through the transistor 794 that is turned on, thereby the voltage VDC2=(VDC+VC) is supplied to the load circuit as an initial value. Consequently, while the level of the voltage boosting clock CLK is high, it is assumed as a boosted voltage output period.

In the above power supply circuit, the charging voltage VC can be set with reference to the reference voltage VR in such a way and the voltage VC never exceeds the reference voltage VR. However, as shown in the case of the output voltage VDC2=(VDC+VC) just after a boosted voltage output period is set, the output voltage VDC2 is affected by a fluctuation of the supply voltage VDC. For example, when the supply voltage VDC is 3 volts, the reference voltage VR is set so as to obtain output voltage VDC2=5 volts. In an ideal case, the relationship between the supply voltage VDC and the output voltage VDC2 becomes as shown in FIG. 2. When the supply voltage VDC is 3 volts, the output voltage VDC2 is 5 volts. And if the reference voltage VDC falls, the output voltage VDC2 also falls, resulting in insufficient voltage. On the other hand, if the supply voltage VDC rises, the output voltage VDC2 also rises, thereby the element breakdown voltage might be exceeded. In other words, in the above power supply circuit, in order to keep the output voltage VDC2 constantly, the reference voltage VR should be varied in accordance with the supply voltage VDC.

FIG. 3 shows a circuit diagram of a charge pump power supply circuit disclosed in Japanese Patent Laid-Open Application No. 2005-278383. This power supply circuit includes a voltage boosting circuit 890, a comparison circuit 870, a control circuit 880, and a smoothing capacitor 899. The power supply circuit supplies an output voltage VDC2 to a load circuit (not shown).

The voltage boosting circuit 890 includes transistors (switches) 891 to 894 and a voltage boosting capacitor 897. The transistors 891 and 893 are switches for applying a supply voltage VDC to the voltage boosting capacitor 897, thereby charging the capacitor 897. The transistor 892 is a switch for connecting the supply voltage VDC serially to the voltage boosting capacitor 897 that is already charged, thereby boosting the voltage of the capacitor 897. The transistor 894 is a switch for supplying the boosted voltage to the load circuit as a boosted voltage output VDC2.

The comparison circuit 870 includes a comparator 873 and resistance elements 871 and 872. Each of the resistance elements 871 and 872 divides the output voltage VDC2 of the voltage boosting circuit 890 to generate a comparison voltage VCMP. The comparator 873 compares the comparison voltage VCMP with the reference voltage VR and outputs the comparison result VCTL to the control circuit 880. The control circuit 880 includes a level shift circuit 883, a NAND circuit 881, and a NOT circuit 882. The control circuit 880 controls the on/off state of each of the transistors 891 to 894 of the voltage boosting circuit 890 according to the comparison result VCTL output from the comparison circuit 870 and the voltage boosting clock CLK.

The output of the voltage boosting circuit 890 is smoothed by the smoothing capacitor 899 and the result is supplied to the load circuit. The smoothed output voltage VDC2 is also supplied to the NAND circuit 881, the NOT circuit 882, the level shift circuit 883 of the control circuit 880, etc.

Next, there will be described the operation of this power supply circuit with reference to FIGS. 4A to 4D. When the level of the voltage boosting clock CLK is low (FIG. 4A), the output level of the NAND circuit 881 becomes high and the transistors 891 and 893 are turned on while the transistors 892 and 894 are turned off. Consequently, the supply voltage VDC is applied to the voltage boosting capacitor 897, which is thus charged until the charging voltage VC becomes equal to the supply voltage VDC (FIG. 4B).

While the level of the voltage boosting clock CLK is high (FIG. 4A), if the level of the comparison result VCTL is high, the output of the NOT circuit 882 becomes high (FIG. 4D). And because the output voltage VDC2 is discharged until it goes lower than the predetermined voltage V2 (FIG. 4D), the output level of the comparison circuit 870 is high and the output level of the NAND circuit 881 is low. Consequently, the transistors 891 and 893 are turned off while the transistors 892 and 894 are turned on. In other words, the supply voltage VDC is applied to the connecting node between the voltage boosting capacitor 897 and the transistor 891 through the transistor 892, thereby the voltage VC− of the connecting node is assumed as a voltage VDC as shown in FIG. 4C. Consequently, the voltage of the connecting node between the voltage boosting capacitor 897 and the transistor 893 is boosted by the same voltage as the supply voltage VDC. If the voltage of the voltage boosting capacitor 897 is assumed as VC, the voltage VC+ of the connecting node between the voltage boosting capacitor 897 and the transistor 893 becomes VDC+VC (FIG. 4B). The connecting node between the voltage boosting capacitor 897 and the transistor 893 is connected to the smoothing capacitor 899 through the transistor 894 and the voltage VDC2=(VDC+VC) is supplied to the connecting node. And because the charging voltage VC is kept charged until it becomes equal to the supply voltage VDC, the output voltage VDC2 becomes double the voltage VDC instantaneously (FIG. 4D).

The comparator 873 compares the comparison voltage VCMP with the reference voltage VR. The VCMP is obtained by dividing the output voltage VDC2 through any of the resistance elements 871 and 872. The output level of the comparator 873 becomes high when the comparison voltage VCMP is lower than the reference voltage VR (VCMP<VR) and becomes low when the comparison voltage VCMP is higher than the reference voltage VR (VCMP≦VR). When the output level of the comparison circuit 870 is high, the output level of the NAND circuit 881 of the control circuit 880 becomes low, thereby the voltage boosting circuit 890 keeps discharging. If the output level of the comparison circuit 870 becomes low, the output level of the NAND circuit 881 becomes high, thereby the voltage boosting circuit 890 stops discharging.

When the state of the voltage boosting circuit 890 is switched from charging to discharging, the output voltage VDC2 becomes double the VDC. Thus the output level of the comparison circuit 870 becomes low and the state of the voltage boosting circuit 890 is switched from discharging to charging. Consequently, the smoothing capacitor 899 is discharged and the output voltage VDC2 falls gradually in accordance with the power consumption of the load circuit. If the comparison voltage VCMP obtained by dividing the output voltage VDC2 becomes lower than the reference voltage VR, the output level of the comparison circuit 870 becomes high and the state of the voltage boosting circuit 890 is switched to discharging.

In this power supply circuit, the output voltage VDC2 is controlled so that the comparison voltage VCMP obtained by dividing the VDC2 is equalized to the reference voltage VR as described above. Consequently, this power supply circuit can keep the output voltage VDC2 at a predetermined voltage V2 without changing its setting regardless of the changes of the supply voltage VDC. However, the voltage boosting capacitor 897 is charged up to the supply voltage VDC during the charging period, so that the output voltage VDC2, as shown in FIG. 4D), goes over the predetermined voltage V2 just after discharging and becomes about double the supply voltage VDC. In other words, an element to which the output voltage VDC2 is supplied should be set at a high breakdown voltage so as to withstand the instantaneous output voltage VDC2. Rising of this instantaneous output voltage VDC2 causes random noise generation. The output voltage VDC2, as shown in FIG. 5, is assumed as a power supply of a source driver and such noise affects the output of the source driver. And the fluctuation of the source driver causes horizontal stripes to appear on the screen, resulting in degradation of the display quality if the source driver output is not synchronized with the panel display frequency.

As described above, in a conventional power supply circuit, obtaining a predetermined output voltage from any of wide ranged supply voltages has been confronted with various problems. For example, it has been required to change settings in accordance with the supply voltage, noise is generated, and the element breakdown voltage is exceeded.

Under such circumstances, it is an exemplary feature of the present invention to provide a power supply circuit capable of obtaining a predetermined output voltage from any of wide ranged supply voltages without changing the settings.

SUMMARY OF THE DISCLOSURE

According to one exemplary aspect of the present invention, the voltage boosting power supply circuit includes a voltage boosting capacitor, a first switch, a second switch, an addition comparison circuit, and a control circuit. The first switch applies a first voltage to the voltage boosting capacitor, thereby charging the capacitor. The second switch connects a second voltage serially to the voltage boosting capacitor that is already charged, thereby boosting the voltage of the capacitor. The addition comparison circuit adds up the voltage of the voltage boosting capacitor that is being charged and the second voltage, then compares the addition result with a predetermined threshold value. The control circuit controls the on/off state of the first switch according to the comparison result of the addition comparison circuit. The first and second voltages may be the same voltage.

According to another exemplary aspect of the present invention, the boosted voltage control method includes a charging step, a voltage boosting step, an addition step, a comparison step, and a control step. In the charging step, a first voltage is applied to the voltage boosting capacitor to charge the capacitor. In the voltage boosting step, a second voltage is connected serially to the voltage boosting capacitor that is already charged to boost the voltage of the capacitor. In the addition step, the voltage of the voltage boosting capacitor that is being charged is added to the second voltage and the addition result is output. In the comparison step, the addition result is compared with a predetermined threshold value and the comparison result is output. And in the control step, charging of the voltage boosting capacitor stops according to the comparison result.

According to still another exemplary aspect of the present invention, the voltage boosting power supply circuit includes a voltage boosting capacitor, a first switch, a second switch, an addition comparison circuit, and a control circuit. The first switch applies a first voltage to the voltage boosting capacitor, thereby charging the capacitor. The second switch connects a second voltage serially to the voltage boosting capacitor that is already charged, thereby boosting the voltage of the capacitor. The addition comparison circuit adds up the voltage of the voltage boosting capacitor that is being charged and the second voltage, then compares the addition result with a predetermined threshold value. The control circuit controls the on/off state of the first switch according to the comparison result of the addition comparison circuit. The first and second voltages may be the same voltage.

According to still another exemplary aspect of the present invention, the boosted voltage control method includes a charging step, a voltage boosting step, an addition step, a comparison step, and a control step. In the charging step, a first voltage is applied to the voltage boosting capacitor through a resistance element to charge the capacitor. In the voltage boosting step, a second voltage is connected serially to the voltage boosting capacitor that is already charged to boost the voltage of the capacitor. In the addition step, the voltage of the voltage boosting capacitor that is being charged is added to the second voltage and the addition result is output. In the comparison step, the addition result is compared with a predetermined threshold value and the comparison result is output. And in the control step, charging of the voltage boosting capacitor stops according to the comparison result.

As described above, according to the present invention, it is possible to provide a power supply circuit capable of obtaining a predetermined output voltage from any of wide ranged supply voltages without changing the settings.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

Figure 1:
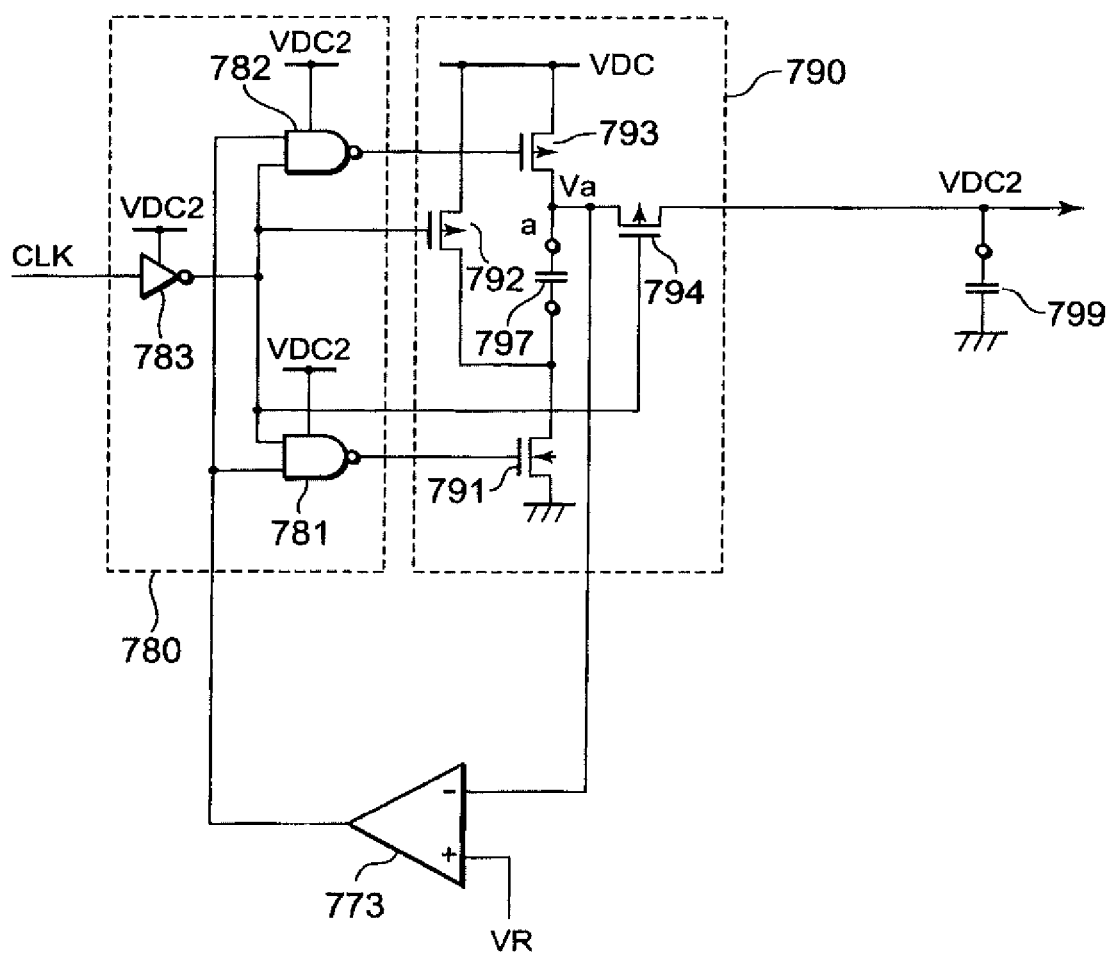
FIG. 1 is a diagram for showing example 1 of a conventional charge pump power supply circuit.
Figure 2:
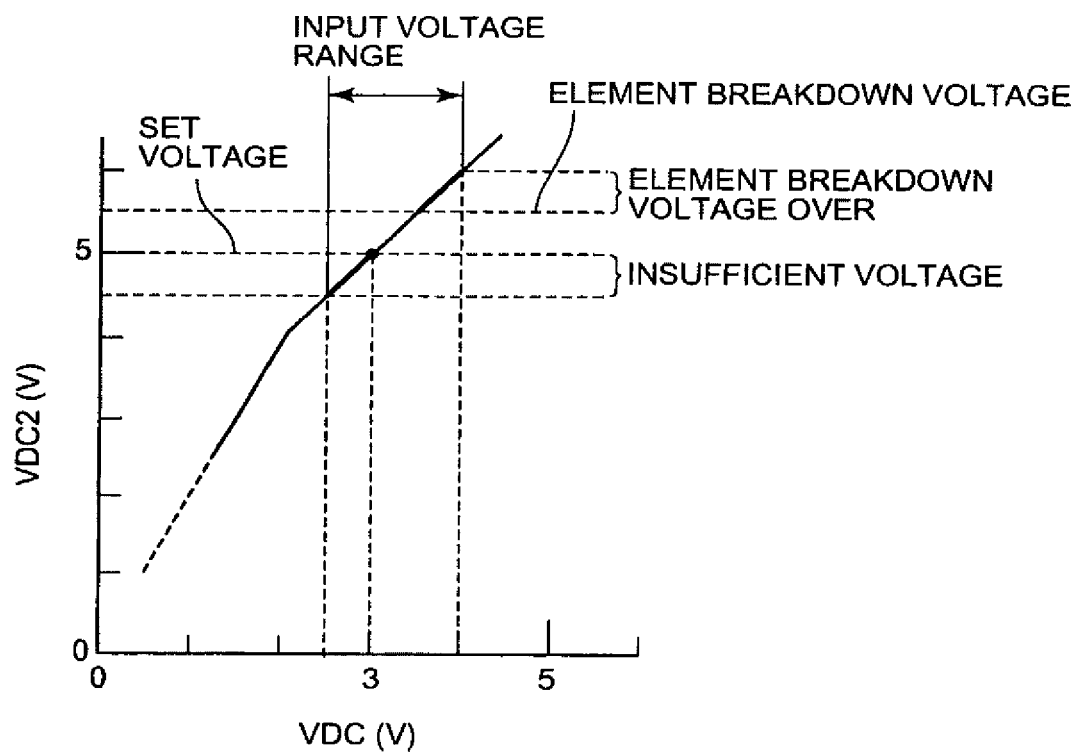
FIG. 2 is a diagram for showing a relationship between a supply voltage and an output voltage in the example 1.
Figure 3:
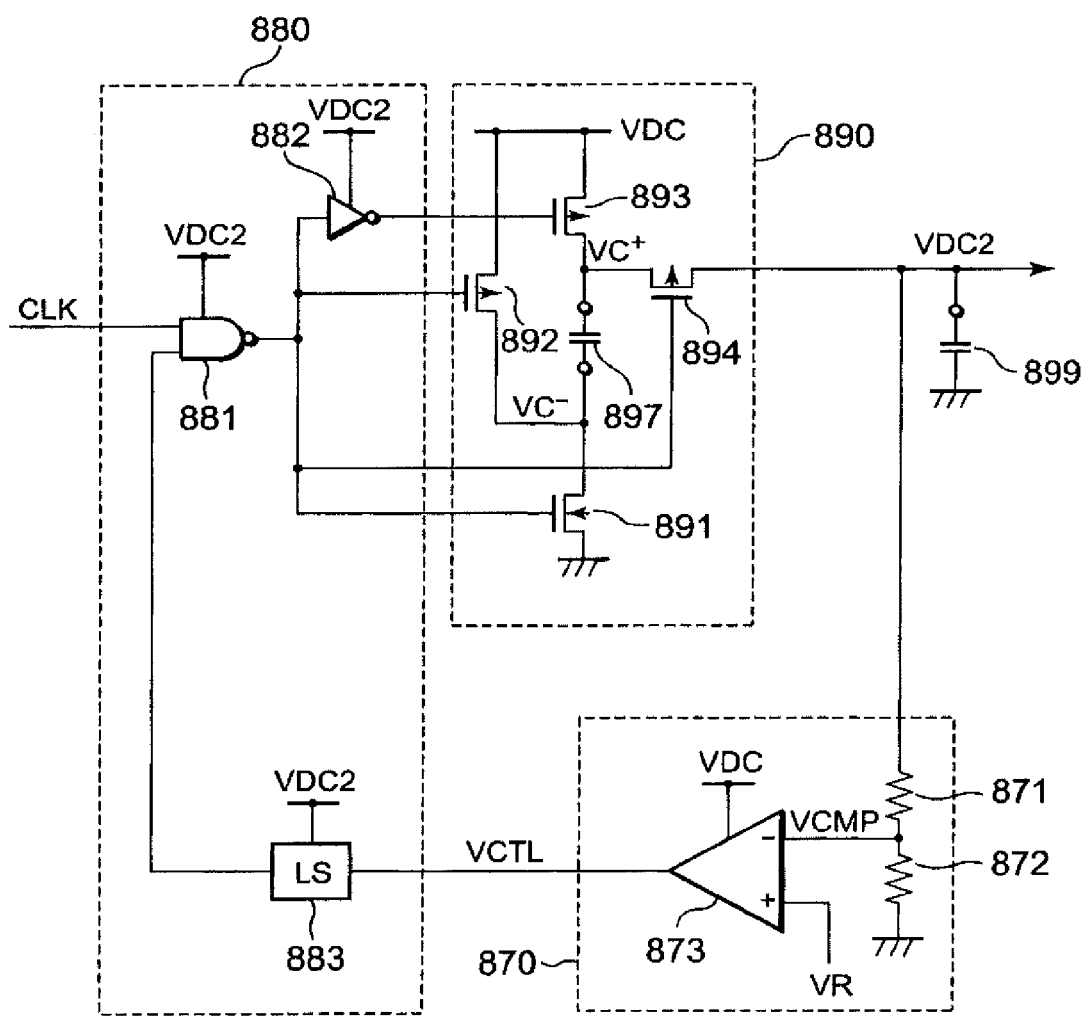
FIG. 3 is a diagram for showing example 2 of the conventional charge pump power supply circuit.
Figure 4A:
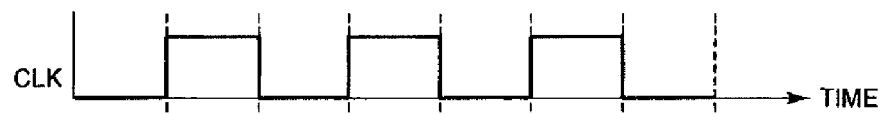
FIGS. 4A to 4D are diagram for showing a waveform of a voltage of each node in the example 2.
Figure 4B:
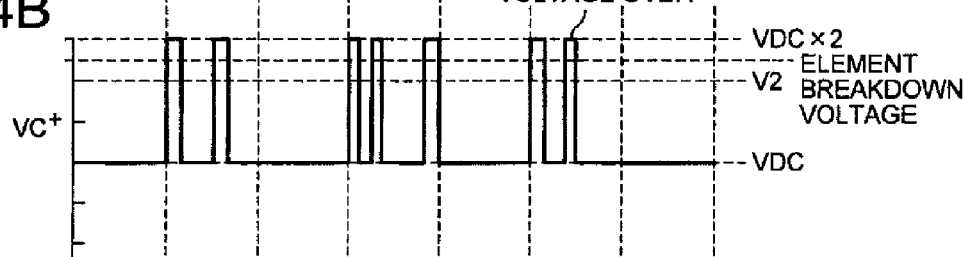
Figure 4C:
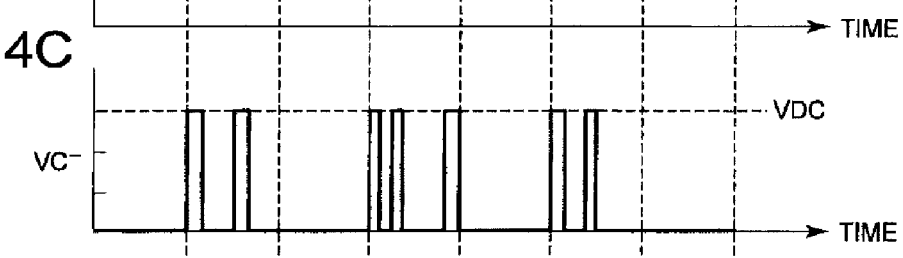
Figure 4D:
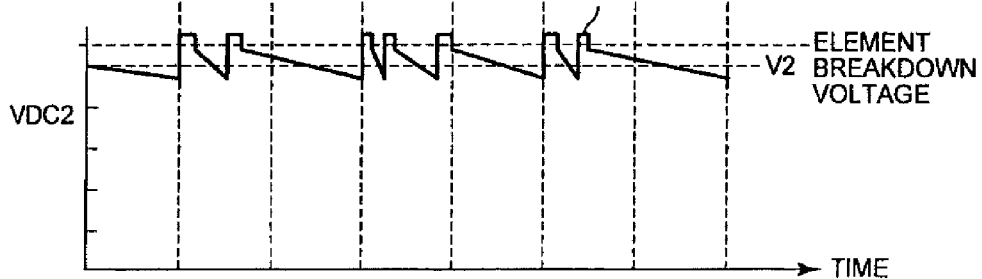
Figure 5:
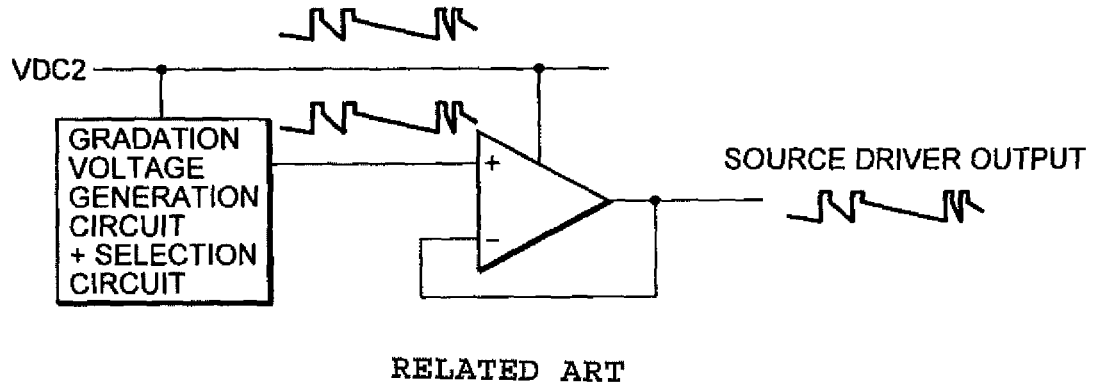
FIG. 5 is a diagram for describing an influence to be exerted on an output of a source driver.
Figure 6:
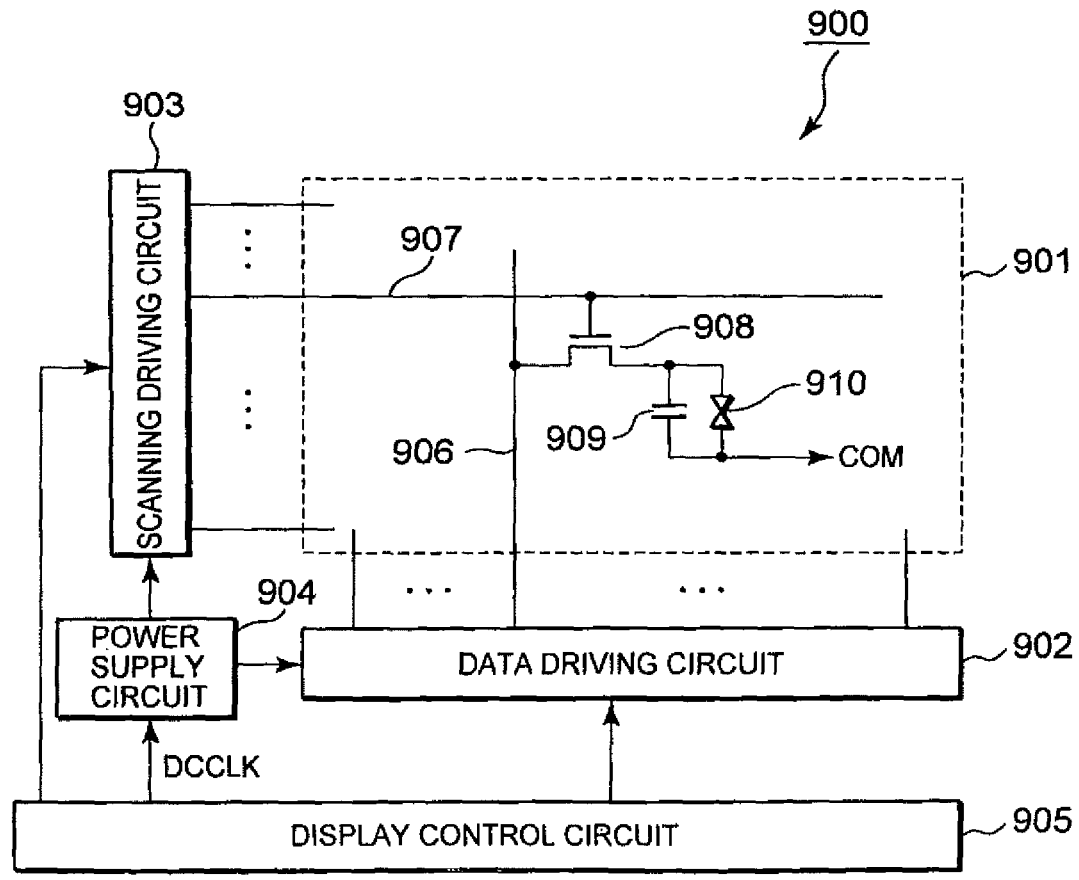
FIG. 6 is a block diagram for showing a configuration of a liquid crystal display apparatus in an embodiment of the present invention.

FIG. 6 is a block diagram for showing a configuration of a liquid crystal display apparatus in an exemplary embodiment of the present invention. The liquid crystal display apparatus 900 includes a liquid crystal display panel 901, a data side driving circuit. 902, a scanning side driving circuit 903, a power supply circuit 904, and a display control circuit 905.

The liquid crystal display panel 901 includes a plurality of data lines disposed horizontally and extended vertically, as well as a plurality of scanning lines 907 disposed vertically and extended horizontally. A pixel is formed at a cross point of a data line 906 and a scanning line 907. Each pixel, in a single color as shown in FIG. 6, includes a TFT (Thin Film Transistor) 908, a pixel capacity 909, and a liquid crystal element 910. The gate of the TFT 908 is connected to the scanning line 907 and the source (drain) thereof is connected to the data line 906. The drain (source) of the TFT 908 is connected to the pixel capacity 909 and the liquid crystal element 910 respectively and the other ends of the pixel capacity 909 and the liquid crystal element 910 are connected to a common electrode COM respectively. The liquid crystal element 910 is a capacitive element. In this embodiment, it is premised that the combination of a pixel capacity 909 and a liquid crystal element 910 is referred to as a panel capacity. In the case of a multicolor liquid crystal display panel, each pixel is a set of R, G, and B dots and each dot includes a TFT 908, a pixel capacity 909, and a liquid crystal element 910. The operations are basically the same among liquid crystal display panels.

The data side driving circuit 902 outputs an analog signal voltage (gradation voltage) generated in accordance with a digital image signal (hereinafter, to be referred to as data) to drive the data lines 906. The scanning side driving circuit 903 outputs a TFT 908 selection/non-selection voltage to drive the scanning lines 907. The power supply circuit 904 supplies a voltage to the data side driving circuit 902 for outputting the analog signal voltage and the scanning side driving circuit 903 for outputting the selection/non-selection voltage. The display control circuit 905 generates timing signals for driving the data lines 906 and the scanning lines 907, as well as timing signals for controlling the voltage boosting of the power supply circuit 904 to control the scanning side driving circuit 903, the data side driving circuit 902, and the power supply circuit 904. The display control circuit 905 supplies a display clock signal DCCLK to the power supply circuit 904 as a timing signal.

Figure 7:
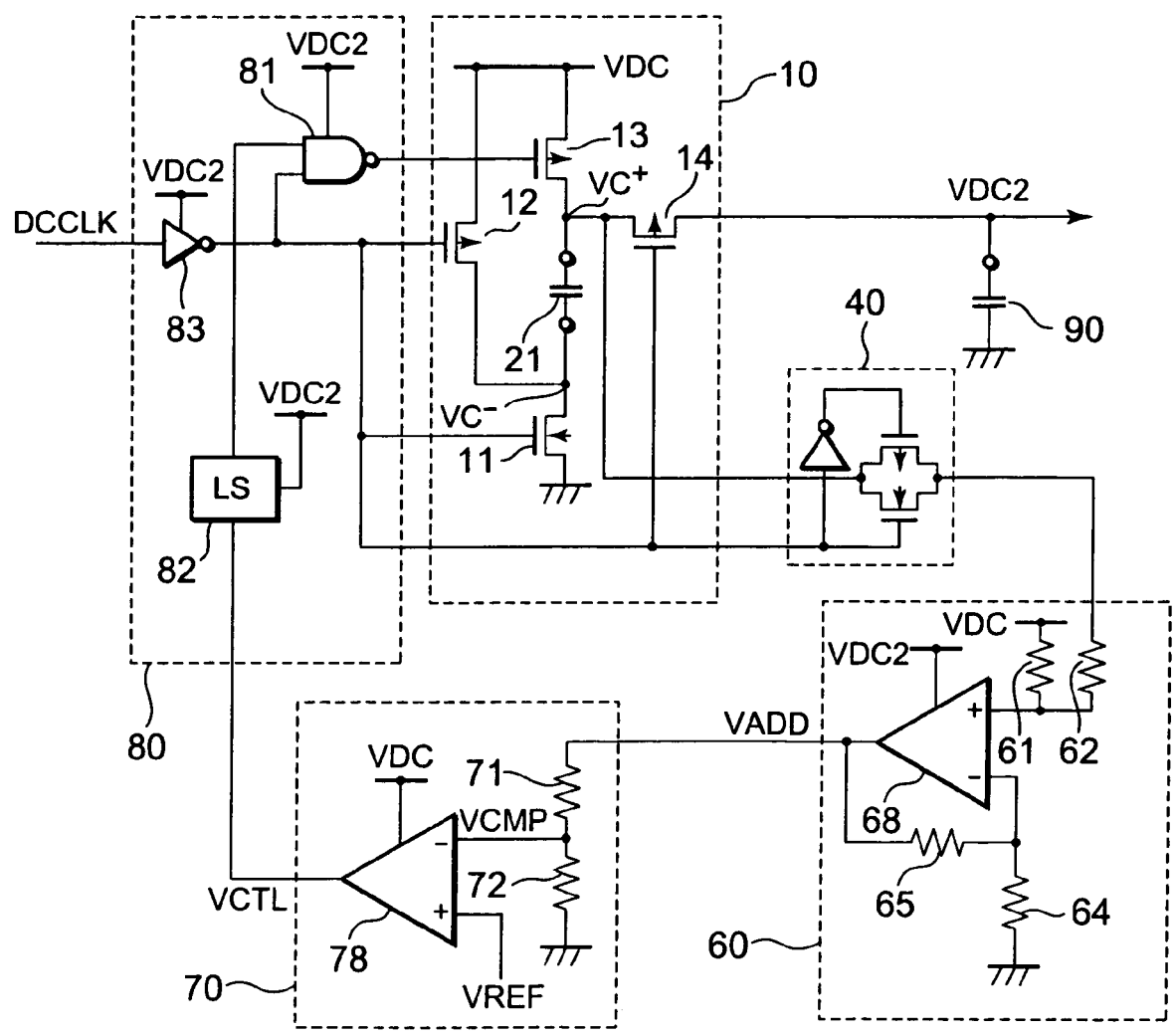
FIG. 7 is a circuit diagram of a power supply circuit in the first embodiment of the present invention.

Next, there will be described a power supply circuit in a first embodiment with reference to FIG. 7. The power supply circuit, as shown in FIG. 7, includes a voltage boosting circuit 10, an addition circuit 60, a comparison circuit 70, a control circuit 80, a transfer gate 40, and a smoothing capacitor 90. The power supply circuit supplies an output voltage VDC2 to a load circuit (not shown).

The voltage boosting circuit 10 includes transistors 11 to 14, and a voltage boosting capacitor 21. The transistors 11 and 13 are switches for charging the voltage boosting capacitor 21 with a supply voltage VDC. The transistor 12 is a switch for connecting a supply voltage VDC serially to the voltage boosting capacitor 21, thereby boosting the voltage of the capacitor 21 that is already charged. The transistor 14 is a switch for discharging the charge from the voltage boosting capacitor 21 with the boosted voltage. The transfer gate 40 includes two transistors and a NOT circuit. The transfer gate 40 is a switch for extracting the voltage VC from the voltage boosting capacitor 21 that is being charged.

The addition circuit 60 includes an operation amplifier 68 and resistance elements 61, 62, 64, and 65. The addition circuit 60 adds up the voltage VC of the voltage boosting capacitor 21 extracted through the transfer gate 40 and the supply voltage VDC. The addition circuit 60 then outputs the addition result to the comparison circuit 70. The comparison circuit 70 includes a comparator 78, and resistance elements 71 and 72. The comparison circuit 70 compares the output voltage of the addition circuit 60 with the reference voltage VREF and outputs the comparison result to the control circuit 80. The control circuit 80 includes a NAND circuit 81, a level shift circuit 82, and a NOT circuit 83 and controls the on/off state of each transistor (switch) and the transfer gate 40 of the voltage boosting circuit 10 according to the comparison result of the comparison circuit 70.

The output of the voltage boosting circuit 10 is smoothed by the smoothing capacitor 90 and the result is supplied to the load circuit. The smoothed output voltage VDC2 is also supplied to the NAND circuit 81, the level shift circuit 82, and the NOT circuit 83 of the control circuit 80, as well as the operation amplifier 68 of the addition circuit 60, etc.

Next, there will be described the operation of the power supply circuit in this first embodiment with reference to FIGS. 8A to 8E.

Figure 8A:
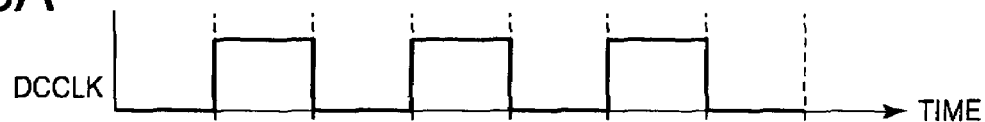
FIGS. 8A to 8E are diagrams for showing a waveform of a voltage of each node of the power supply circuit in the first embodiment of the present invention.
Figure 8B:

The voltage boosting clock DCCLK is a clock signal synchronized with a display clock of the display device as shown in FIG. 8A. The power supply circuit operation is synchronized with this voltage boosting clock DCCLK.

Figure 8C:
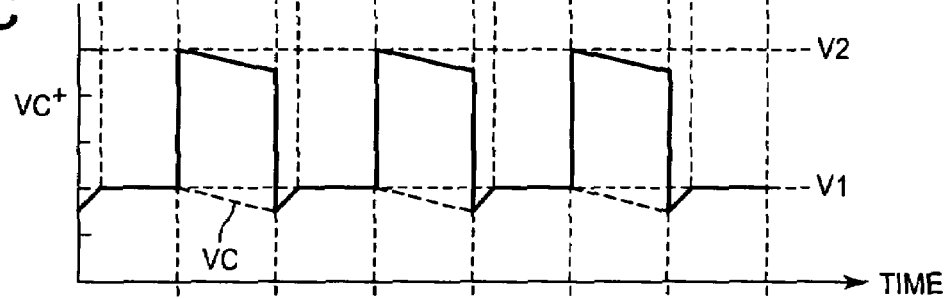

When the level of the output VCTL of the comparison circuit 70 is high (FIG. 8B) and the level of the voltage boosting clock DCCLK is low, the state is assumed as shown on the left end in FIGS. 8A to 8E. And because the output level of the NOT circuit 83 is high and the output level of the NAND circuit 81 is low, the transistors 11 and 13 are turned on while the transistors 12 and 14 are turned off. Consequently, the voltage boosting capacitor 21 is supplied the supply voltage VDC through the transistors 11 and 13, thereby charging is started for the capacitor 21. As shown in FIG. 8C, the voltage VC+ of the connecting node between the voltage boosting capacitor 21 and the transistor 13 rises when this charging starts.

At this time, the transfer gate 40 is turned on and enables the voltage boosting capacitor 21 that is being charged to output its voltage VC to the addition circuit 60. The addition circuit 60 adds the voltage VC that is charged and rises to the supply voltage VDC. In other words, the addition result comes to correspond to the voltage VC+ assumed when charging of the voltage boosting capacitor 21 starts. If the resistance value is equal between the resistance elements 61 and 62 and the resistance values of the resistance elements 64 and 65 are defined as R64 and R65 respectively, the output voltage VADD of the addition circuit 60 will be calculated as follows.

$$VADD = (1 + R65/R64) \cdot (VDC + VC)/2 \qquad (1)$$

The output voltage VADD of this addition circuit 60 is inputted to the comparison circuit 70. In the comparison circuit 70, the output voltage VADD is divided by each of the resistance elements 71 and 72 and the comparison circuit 78 compares each divided voltage VCMP with the reference voltage VREF. If the resistance values of the resistance elements 71 and 72 are defined as R71 and R72 respectively, the voltage VCMP will be calculated as follows.

$$VCMP = VADD \cdot R72/(R71+R72) \quad (2)$$

The output level of the comparator 78 becomes high at VCMP<VREF and low at VCMP≧VREF. In other words, the comparison circuit 70 outputs a high level signal to the control circuit 80 as the comparison result VCTL when the charging voltage VC of the voltage boosting capacitor 21 is lower than a predetermined voltage V1. If the charging voltage exceeds the predetermined voltage V1 as a result of charging, the output level of the comparison circuit 70 becomes low.

The control circuit 80 makes a level shift of the comparison result VCTL of the comparison circuit 70 through the level shift circuit 82 and outputs the result to the NAND circuit 81. Because the output level of the NOT circuit 83 is high, the output level of the NAND circuit 81 becomes low when the level of the comparison result VCTL is high, thereby the transistor 13 is turned on. When the transistor 13 is turned on and the voltage boosting capacitor 21 is further charged, the level of the comparison result VCTL becomes low and the NAND circuit 81 outputs a high level signal to turn off the transistor 13. Consequently, if the charging voltage VC of the voltage boosting capacitor 21 goes over the predetermined voltage V1, the transistor 13 is turned off and charging of the voltage boosting capacitor 21 stops. In such a way, when the level of the voltage boosting clock DCCLK is low, the voltage boosting circuit 10 is charged, thereby the voltage boosting capacitor 21 is charged up to the predetermined voltage V1.

Figure 8D:
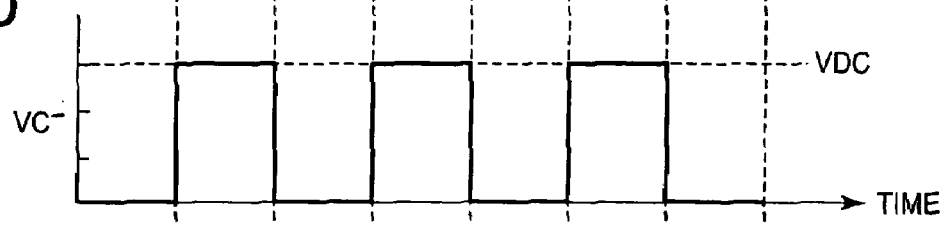

When the level of the voltage boosting clock DCCLK becomes high, the output level of the NOT circuit 83 becomes low, thereby the output level of the NAND circuit 81 becomes high. Consequently, the transistors 11 and 13 are turned off while the transistors 12 and 14 are turned on. Then, the supply voltage VDC is supplied to the connecting node between the voltage boosting capacitor 21 and the transistor 11 through the transistor 12. Consequently, the voltage V− of the connecting node between the voltage boosting capacitor 21 and the transistor 11 is boosted to the voltage VDC in a moment as shown in FIG. 8D. As a result, the voltage VC+ of the node connected to the transistor 13 is boosted to the voltage V2 from the voltage V1 as shown in FIG. 8C. At the same time, the connecting node between the voltage boosting capacitor 21 and the transistor 13 is connected to the smoothing capacitor 90 through the transistor 14, thereby the smoothing capacitor 90 is charged. In other words, the voltage VDC2= (VC+VDC) is supplied to the load circuit through the smoothing capacitor 90.

Figure 8E:
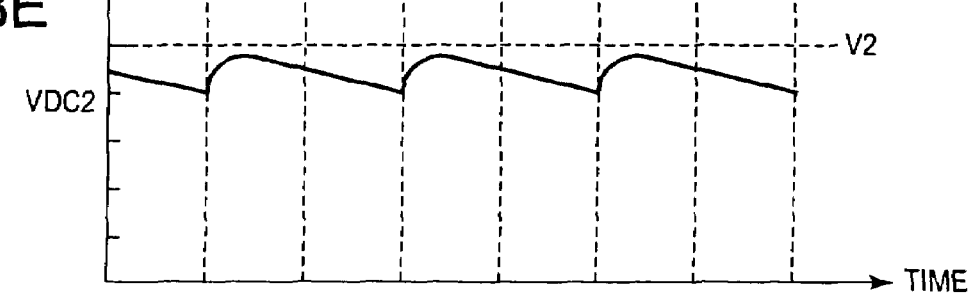

Because the voltage boosting circuit 10 supplies a voltage to the load circuit while charging the smoothing capacitor 90, the output voltage VDC2 begins falling before it rises to the voltage V2 as shown in FIG. 8E. At this time, the transfer gate 40 is turned off while the addition circuit 60 keeps the same state. Thus the charge in the voltage boosting capacitor 21 is moved to the smoothing capacitor 90 and the load circuit, so that the output voltage VDC2 falls gradually. The voltage boosting capacitor 21 is discharged and its voltage VC falls gradually as shown in FIG. 8C. In such a way, when the voltage boosting clock DCCLK is on the high level, the voltage boosting circuit is discharged.

As described above, while the power supply circuit is operating, in order to enable the initial voltage of the output voltage VDC2 to reach a desired voltage value V2, the voltage boosting capacitor 21 should be charged until the voltage VC reaches the voltage value V1 in a charging period. At this time, it is just required that the capacitor 21 is charged up to the voltage VC so as to satisfy VDC+VC=V2 and the comparison circuit 70 stops charging of the voltage boosting capacitor 21. In other words, it is just required to satisfy VCMP=VREF here. Those operations are substituted for the formulas (1) and (2) described above as follows.

$$(1+R65/R64) \cdot V2/2 = VREF \cdot (R71+R72)/R72 \quad (3)$$

In order to satisfy the formula (3), the R64, R65, R71, and R72 are set, thereby the voltage boosting capacitor 21 is charged up to the voltage V1 so as to enable the initial output voltage VDC2 to reach the desired voltage value V2. For example, if R64=R65 and R71=R72 are assumed, V2=2·VREF is assumed and the output voltage is set double the reference voltage. Consequently, at this time, it is just required to set the reference voltage VREF at ½ of the desired voltage value V2. And the voltage VC of the voltage boosting capacitor 21 is never charged over the desired voltage value V2 when the charging starts. And because a sum of the charging voltage VC and the supply voltage VDC that are added up in the addition circuit 60 is to be compared, the charging voltage VC of the voltage boosting capacitor 21 never exceeds the predetermined voltage value V2 upon starting the discharging even when the supply voltage VDC changes.

Figure 9:
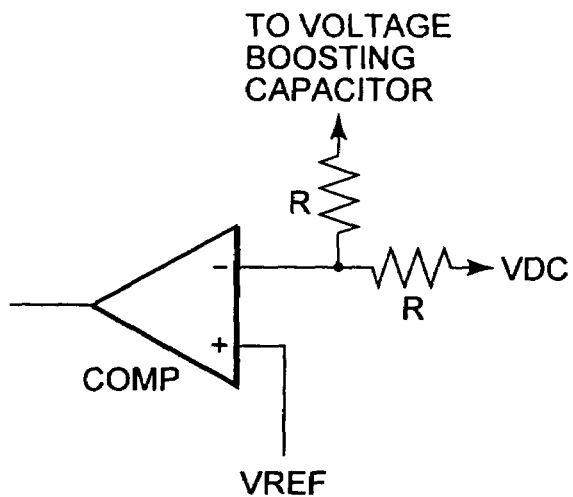
FIG. 9 is a diagram for showing another example of an addition comparison circuit in the first embodiment of the present invention.

FIG. 9 shows another configuration of each of the addition circuit 60 and the comparison circuit 70. A charging voltage VC and a supply voltage VDC are connected to the input of the operation amplifier (comparator) through the resistance elements, thereby the addition circuit 60 and the comparison circuit 70 are united into one. In principle, even such a circuit can operate, but a combination of the addition circuit 60 and the comparison circuit 70 as shown in FIG. 7 is more preferable.

Figure 10:
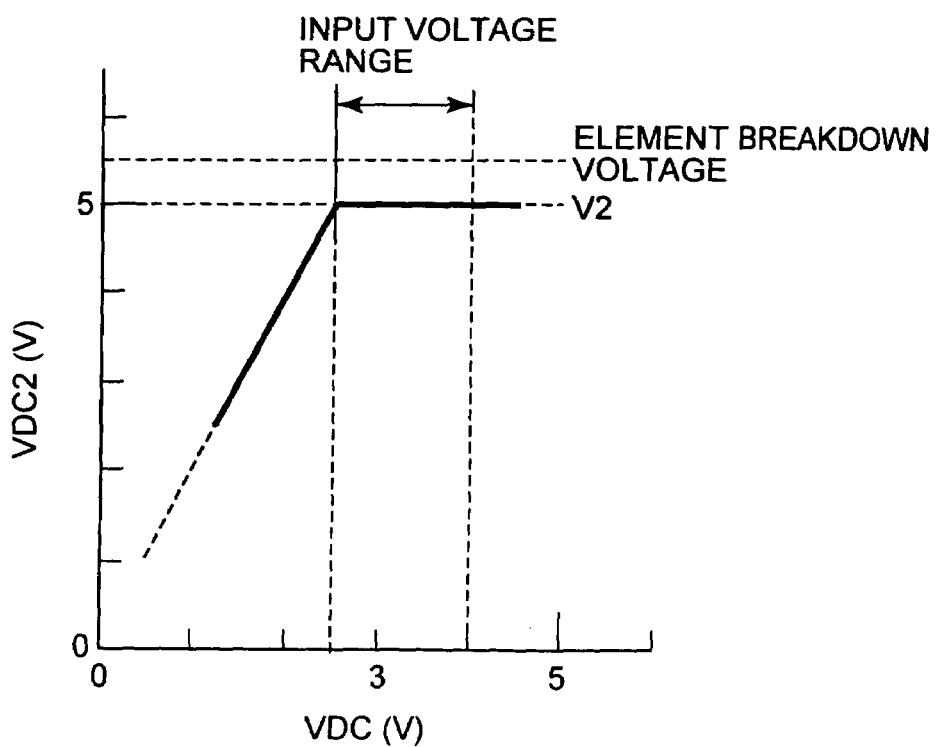
FIG. 10 is a diagram for showing a relationship between a supply voltage VDC and an output voltage VDC2 in the first embodiment of the present invention.

As described above, the charging voltage VC of the voltage boosting capacitor 21 is adjusted to satisfy VC+VDC=V2 with use of the addition circuit 60, the comparison circuit 70, and the control circuit 80. Consequently, although the charging voltage VC is varied by power consumption, the output voltage VDC2 is kept constantly (V2) regardless of the changes of the supply voltage VDC. For example, in the power supply circuit in which the supply voltage VDC is set at 3.0 volts and the output voltage VDC2 is set at 5.0 volts, the relationship between supply voltage VDC and output voltage VDC2 becomes as shown in FIG. 10.

This is why the power supply circuit can use any of wide ranged supply voltages (from low to high voltages) without changing its settings. And because the target voltage value V2 of the output voltage VDC2 is set under the element breakdown voltage, the element breakdown voltage is never exceeded. Furthermore, because the supply voltage VDC is connected to the voltage boosting capacitor 21 during a charging period, the discharging cycle is synchronized with the display clock as shown in FIG. 8E. No noise is thus generated in boosted voltage outputs and no horizontal stripes appear on the screen. Therefore, the display quality is prevented from degradation.

Figure 11:
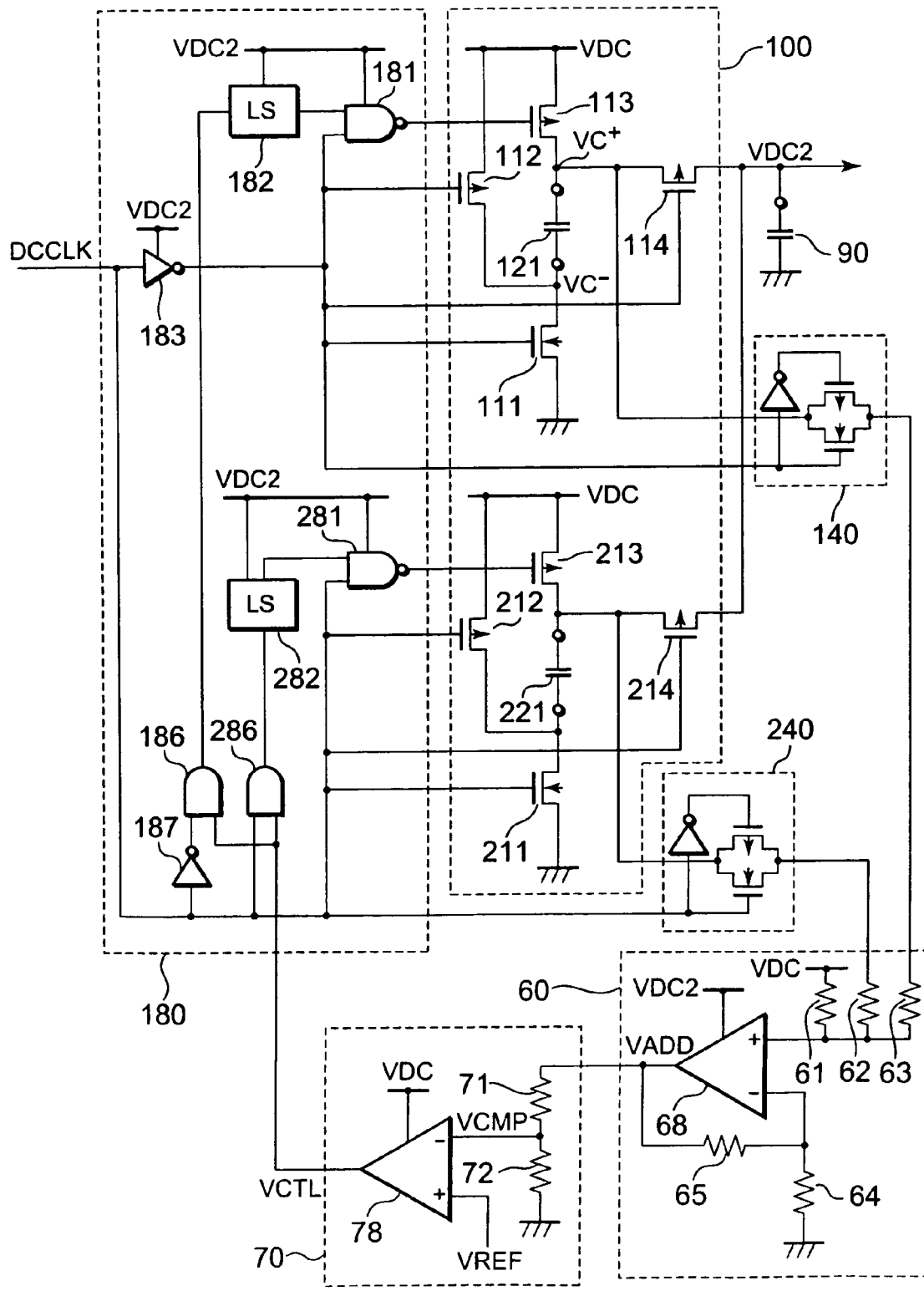
FIG. 11 is a circuit diagram of a power supply circuit in a second embodiment of the present invention.

FIG. 11 shows a circuit diagram of a power supply circuit in a second embodiment of the present invention. This power supply circuit includes a voltage boosting circuit 100, an addition circuit 60, a comparison circuit 70, a control circuit 180, transfer gates 140 and 240, and a smoothing capacitor 90. The power supply circuit supplies an output voltage VDC2 to a load circuit (not shown).

The voltage boosting circuit 100 includes a first voltage boosting circuit that includes transistors 111 to 114 and a voltage boosting capacitor 121, as well as a second voltage boosting circuit that includes transistors 211 to 214 and a voltage boosting capacitor 221. The first and second voltage boosting circuits are the same in both configuration and operation as the voltage boosting circuit 10 described in the first embodiment.

In the first voltage boosting circuit, the transistor 111 and 113 are switches for charging the voltage boosting capacitor 121 with a supply voltage VDC. The transistors 112 and 114 are switches for boosting the charge in the voltage boosting capacitor 121 with the supply voltage VDC, then discharging the charge, thereby supplying an output voltage VDC2 to the smoothing capacitor 90. The transfer gate 140 includes two transistors and a NOT circuit. The transfer gate 140 functions as a switch for extracting the voltage VC1 from the voltage boosting capacitor 121 that is being charged.

In the second voltage boosting circuit, the transistor 211 and 213 are switches for charging the voltage boosting capacitor 221 with the supply voltage VDC. The transistors 212 and 214 are switches for boosting the charge in the voltage boosting capacitor 221 with the supply voltage VDC, then discharging the charge, thereby supplying the output voltage VDC2 to the smoothing capacitor 90. The transfer gate 240 includes two transistors and a NOT circuit. The transfer gate 240 functions as a switch for extracting the voltage VC2 from the voltage boosting capacitor 221 that is being charged.

The addition circuit 60 includes an operation amplifier 68 and resistance elements 61 to 65. While the transfer gate 140 is turned on, the addition circuit 60 adds up the voltage of the voltage boosting capacitor 121 extracted through the transfer gate 140 and the supply voltage VDC and outputs the addition result. While the transfer gate 240 is on, the addition circuit 60 adds up the voltage of the voltage boosting capacitor 221 extracted through the transfer gate 240 and the supply voltage VDC and outputs the addition result. The comparison circuit 70 includes a comparator 78 and resistance elements 71 and 72. The comparison circuit 70 compares the output voltage of the addition circuit with a reference voltage VREF and outputs the comparison result to the control circuit 180.

The control circuit 180 includes NAND circuits 181 and 281, level shift circuits 182 and 282, AND circuits 186 and 286, and NOT circuits 183 and 283. The control circuit 180 controls the on/off state of each of the transistors (switches) and the transfer gates 140 and 240 of the voltage boosting circuit 100. The AND circuits 186 and 286, as well as the NOT circuit 187, synchronously with the voltage boosting clock DCCLK, controls so that the first and second voltage boosting circuits repeat charging period and voltage boosting period alternately and outputs the comparison result between charging periods to the corresponding NAND circuits 181 and 281, respectively.

The output of the voltage boosting circuit 100 is smoothed by the smoothing capacitor 90 and the result is supplied to the load circuit. The smoothed output voltage VDC2 is also supplied to the NAND circuits 181 and 281, the level shift circuits 182 and 282, the NOT circuit 183 of the control circuit 180, as well as the operation amplifier 68 of the addition circuit 60, etc.

Next, there will be described the operation of the power supply circuit in this second embodiment.

At first, the output level of the comparison circuit 70 is assumed to be high. And, when the level of the voltage boosting clock DCCLK is low, the NOT circuit 183 outputs a high level signal, thereby the transistor 111 is turned on and the transistors 112 and 114 are turned off. Then, the output level of the NOT circuit 187 becomes high, so that the AND circuit 186 outputs a high level signal and the NAND circuit 181 outputs a low level signal, thereby the transistor 113 is turned on. Consequently, the voltage VC+ of the connecting node between the voltage boosting capacitor 21 and the transistor 13 rises at the start of a charging period.

At this time, the transfer gate 140 is on and outputs the voltage VC1 of the voltage boosting capacitor 21 that is being charged to the addition circuit 60. At this time, the transfer gate 240 is off and the addition circuit 60 adds the voltage VC1 that is charged and risen to the supply voltage VDC. Thus the addition result comes to correspond to the voltage VC+ when the voltage boosting capacitor 121 begins discharging.

The addition result of the addition circuit 60 is inputted to the comparison circuit 70. In the comparison circuit 70, each of the resistance elements divides the addition result and the comparator 78 compares each divided voltage VCMP with a reference voltage VREF. The comparison circuit 70 outputs a high level signal to the control circuit 80 as the comparison result when the charging voltage of the voltage boosting capacitor 121 is lower than the predetermined voltage value V1. When the charging voltage exceeds the predetermined voltage value V1 as a result of charging, the comparison circuit 70 outputs a low level signal.

When the level of the comparison result becomes low, the AND circuit 186 of the control circuit 180 outputs a low level signal. The output of the AND circuit is subjected to a level shift in the level shift circuit 182 and the result is inputted to the NAND circuit 181. The NAND circuit 181 outputs a high level signal, thereby the transistor 113 is turned off. Consequently, when the charging voltage VC1 of the voltage boosting capacitor 121 exceeds the predetermined voltage V1, the transistor 113 is turned off, thereby the charging of the voltage boosting capacitor 181 stops.

On the other hand, in the voltage boosting circuit, the level of the voltage boosting clock CDCLK is low, so that the NAND circuit 281 outputs a high level signal. Thus the transistors 211 and 213 are turned off and the transistors 212 and 214 are turned on. Consequently, the supply voltage VDC is supplied to the connection node between the voltage boosting capacitor 221 and the transistor 211 through the transistor 212 while the connecting node between the voltage boosting capacitor 221 and the transistor 213 is connected to the smoothing capacitor 90 through the transistor 214 and supplies the output voltage VDC2. In other words, the second voltage boosting circuit is discharged while the level of the voltage boosting clock DCCLK is low.

When the level of the voltage boosting clock CDCLK is high, the NOT circuit 183 outputs a low level signal and the NAND circuit 181 outputs a high level signal. In the first voltage boosting circuit, therefore, the transistors 111 and 113 are turned off and the transistors 112 and 114 are turned on. At this time, the supply voltage VDC is supplied to the connecting node between the voltage boosting capacitor 121 and the transistor 111 through the transistor 112 while the connecting node between the voltage boosting capacitor 221 and the transistor is connected to the smoothing capacitor 90 through the transistor 114 and supplies the output voltage VDC2. In other words, the first voltage boosting circuit is switched to discharging.

On the other hand, in the second voltage boosting circuit, while the comparison circuit 70 outputs a high level signal and the AND circuit 286 also outputs a high level signal and the NAND circuit 281 outputs a low level signal. Thus the transistors 211 and 213 are turned on and the transistors 212 and 214 are turned off. Consequently, the voltage boosting capacitor 221 is charged with the supply voltage VDC. At this time, the transfer gate is on, so that the voltage VC2 of the voltage boosting capacitor 221 is supplied to the addition circuit 60 through the transfer gate 240. Furthermore, because the transfer gate 140 is off, the addition circuit 60 adds up the voltage VC2 of the voltage boosting capacitor 221 and the supply voltage VDC. Each of the resistance elements 71 and 72 divides the output voltage of the addition circuit 60, then the comparison circuit 70 compares each divided voltage VCMP with the reference voltage VREF.

The comparison circuit 70 outputs a high level signal as the comparison result when the level of the voltage VC2 of the voltage boosting capacitor 221 is lower than the predetermined voltage V1 and outputs a low level signal when the voltage VC2 exceeds the predetermined voltage. When the comparison circuit 70 outputs a low level signal, the AND circuit of the control circuit 180 outputs a low level signal and the NAND circuit 281 thereof outputs a high level signal respectively. Consequently, the transistor 213 is turned off, thereby the charging of the voltage boosting capacitor 221 stops.

In such a way, the first voltage boosting circuit assumes a period during which the level of the voltage boosting clock DCLK is low as a charging period and a period during which the level of the voltage boosting clock DCCLK is high as a boosted voltage output period. The second voltage boosting circuit assumes a period during which the level of the voltage boosting clock DCCLK is high as a charging period and a period during which the level of the voltage boosting clock DCCLK is low as a boosted voltage output period. Consequently, the voltage boosting circuit 100 operates so that the first and second voltage boosting circuits compensate each other, thereby the boosted output voltage VDC2 falls less with respect to the load current (high power supply performance) in the voltage boosting circuit 100.

Because the voltage of the voltage boosting capacitor 121 or 221 that is being charged is added to the supply voltage VDC and according to the addition result, the transistor 113 or 213 is turned on/off, the output voltage VDC2 never exceeds the element breakdown voltage. Furthermore, the power supply circuit can use any of wide ranged supply voltages (from low to high voltages) without changing its settings. Furthermore, because the discharging cycle is synchronized with the voltage boosting clock DCCLK, no noise is generated in the boosted output voltage and no horizontal stripes appears on the screen. Thus the display quality is prevented from degradation.

Figure 12:
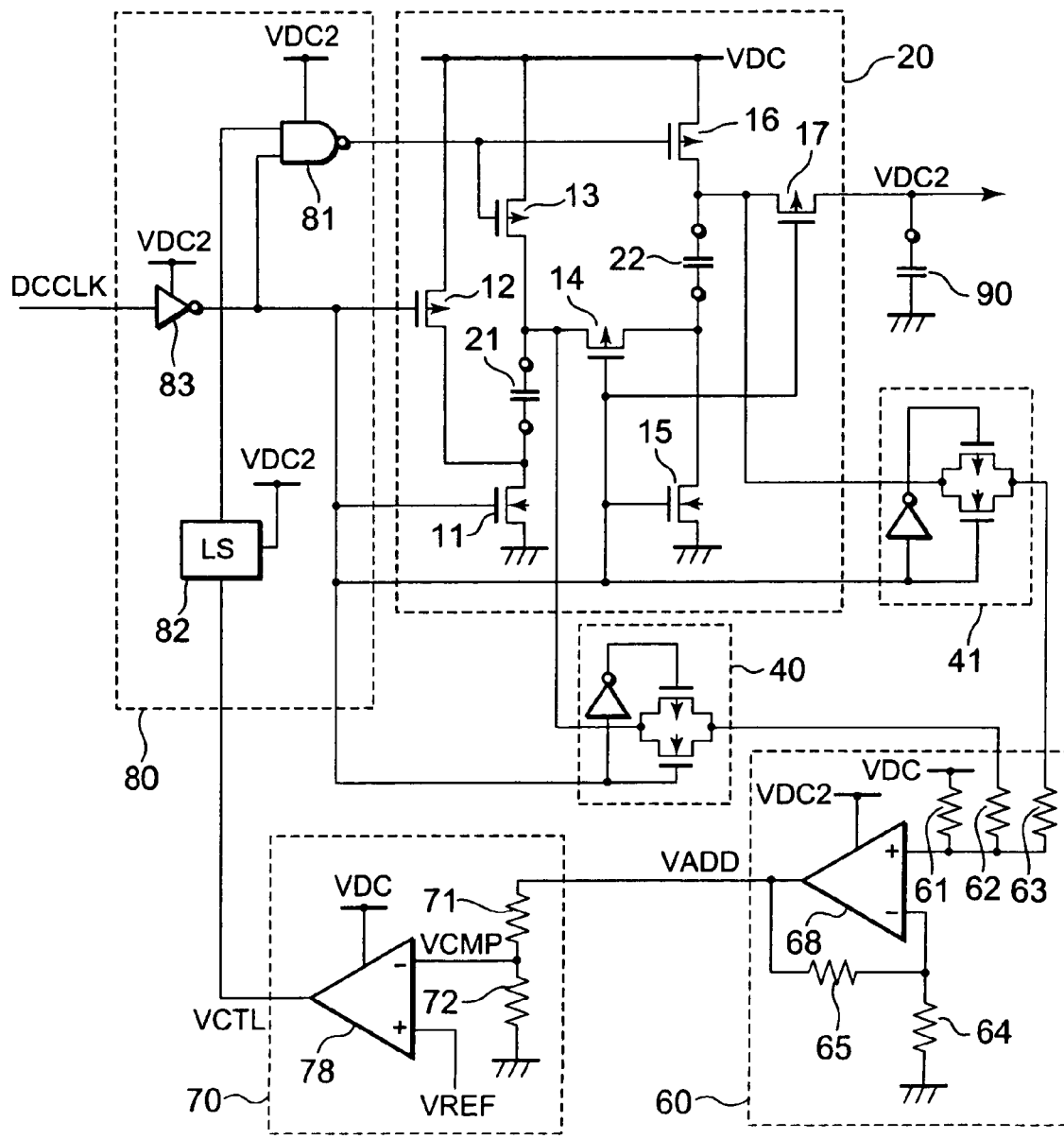
FIG. 12 is a circuit diagram of a power supply circuit in a third embodiment of the present invention.

FIG. 12 shows a circuit diagram of a power supply circuit in a third embodiment. This power supply circuit includes a voltage boosting circuit 20, an addition circuit 60, a comparison circuit 70, a control circuit 80, transfer gates 40 and 41, and a smoothing capacitor 90. The power supply circuit supplies an output voltage VDC2 to a load circuit (not shown).

The voltage boosting circuit 20 includes transistors 11 to 17 and voltage boosting capacitors 21 and 22. The transistor 11 and 13 are switches for applying the supply voltage VDC to the voltage boosting capacitor 21, thereby charging the capacitor 21. The transistors 12 is a switch for connecting the supply voltage VDC serially to the voltage boosting capacitor 21, thereby boosting the charge in the capacitor 21. The transfer gate 40 includes two transistors and a NOT circuit. The transfer gate 40 functions as a switch for extracting the voltage VC1 from the voltage boosting capacitor 21 that is being charged. The transistors 15 and 16 are switches for applying the supply voltage VDC to the voltage boosting capacitor 22, thereby charging the capacitor 22. The transistor 14 is a switch for boosting the charge in the voltage boosting capacitor 22 with the voltage VC1 of the voltage boosting capacitor 21 of which voltage is already boosted by the transistor 12. The transistor 17 is a switch for discharging the charge from the voltage boosting capacitor 22, thereby supplying the output voltage VDC2 to the smoothing capacitor 90. The transfer gate 41 includes two transistors and a NOT circuit and functions as a switch for extracting the voltage VC2 from the voltage boosting capacitor 22 that is being charged.

The addition circuit 60 includes an operation amplifier 68 and resistance elements 61 to 65. The addition circuit adds up the voltage VC1 of the voltage boosting capacitor 21 extracted through the transfer gate 40, the voltage DC2 of the voltage boosting capacitor 22, and the supply voltage VDC. The comparison circuit 70 includes a comparator 78 and resistance elements 71 and 72. The comparison circuit 70 compares the output voltage of the addition circuit 60 with a reference voltage VREF and outputs the comparison result to the control circuit 80. The control circuit 80 includes a NAND circuit 81, a level shift circuit 82, and a NOT circuit 83. The control circuit 80 controls the on/off state of each of the transistors (switches) and the transfer gates 40 and 41 of the voltage boosting circuit 20 according to the voltage boosting clock DCCLK and the comparison result of the comparison circuit 70.

The output of the voltage boosting circuit 20 is smoothed by the smoothing capacitor 90 and the result is supplied to the load circuit. The smoothed output voltage VDC2 is also supplied to the NAND circuits 81, the level shift circuits 82, the NOT circuit 83 of the control circuit 80, as well as the operation amplifier 68 of the addition circuit 60, etc.

Next, there will be described the operation of the power supply circuit in this third embodiment.

At first, the level of the output VCTL of the comparison circuit 70 is assumed to be high. Then, when the level of the voltage boosting clock DCCLK becomes low, the NOT circuit 83 outputs a high level signal and the NAND circuit 81 outputs a low level signal, thereby the transistors 11, 13, 15, and 16 are turned on and the transistors 12, 14, and 17 are turned off. Consequently, the voltage boosting capacitor 21 is supplied the voltage VDC through the transistors 11 and 13 while the voltage boosting capacitor 22 is supplied the voltage VDC through the transistors 15 and 16, thereby those voltage boosting capacities 21 and 22 are charged respectively.

At this time, the transfer gates 40 and 41 are on and outputs the voltages VC1 and VC2 of the voltage boosting capacitors 21 and 22 that are being charged to the addition circuit 60. At this time, the addition circuit 60 adds up the charging voltage VC1 of the voltage boosting capacitor 21, the charging voltage VC2 of the voltage boosting capacitor 22, and the supply voltage VDC, then outputs the output voltage VADD to the comparison circuit 70. If the resistance value is equal among the resistance elements 61 to 63 and the resistance values of the resistance elements 64 and 65 are defined as R64 and R65 respectively, the output voltage VADD of the addition circuit 60 is calculated as follows.

$$VADD=(1+R65/R64)\cdot(VC1+VC2+VDC)/3 \quad (4)$$

In the comparison circuit 70, each of the resistance elements 71 and 72 divides the voltage VADD and the comparator 78 compares each divided voltage VCMP with a reference voltage VREF. If the resistance values of the resistance elements 71 and 72 are defined as R71 and R72 respectively here, so that the voltage VCMP is calculated as follows.

$$VCMP = VADD \cdot R72/(R71+R72) \quad (5)$$

Consequently, the comparator 78 outputs a high level signal at VCMP<VREF and outputs a low level signal at VCMP≧VREF. When the comparator 78 outputs a high level signal, the NAND circuit 81 of the control circuit 80 outputs a low level signal, thereby the voltage boosting circuit 20 is charged. While the comparator 78 outputs a low level signal, the NAND circuit 81 outputs a high level signal, thereby the transistors 13 and 16 are turned off and the charging of the voltage boosting capacitors 21 and 22 stop.

When the level of the voltage boosting clock DCCLK becomes high, the output level of the NOT circuit 83 becomes low and the output level of the NAND circuit 81 becomes high, thereby the transistors 11, 13, 15, and 16 are turned off while the transistors 12, 14, and 17 are turned on. Consequently, the supply voltage VDC and the voltage boosting capacitors C21 and C22 are connected to each another serially, thereby a voltage VDC+VC1+VC2 is applied to the smoothing capacitor 90. In other words, the output voltage VDC2 becomes a voltage VDC+VC1+VC2.

If the voltage value of a desired boosted output voltage VDC2 is assumed as V3, it is just required to satisfy VCMP=VREF here at VDC+VC1+VC2=V3, so that those items are substituted in the formulas (4) and (5) as follows.

$$(1+R65/R64) \cdot V3/3 = VREF \cdot (R71+R72)/R72 \quad (6)$$

R64, R65, R71, and R72 are selected so as to satisfy the formula (6), thereby the charging voltages VC1 and VC2 are adjusted so as to satisfy the output voltage VDC2=V3.

In such a way, the power supply circuit in this third embodiment uses two voltage boosting capacitors and can generate a boosted output voltage that is three times the supply voltage VDC in maximum. Even the power supply circuit can obtain the same effect as that in the first embodiment by adding the voltages VC1 and VC2 charged into the voltage boosting capacitors 21 and 22 at the time of charging to the supply voltage VDC and controlling the on/off state of each of the transistors 13 and 16 in accordance with the addition result.

Furthermore, even upon increasing the voltage boosting power by adding another voltage boosting capacitor to the power supply circuit, the same effect can be obtained by adding up the charging voltages of all the voltage boosting capacitors that are being charged and controlling the on/off state of each switch for supplying a voltage for charging each voltage boosting capacitor according to the addition result.

Figure 13:
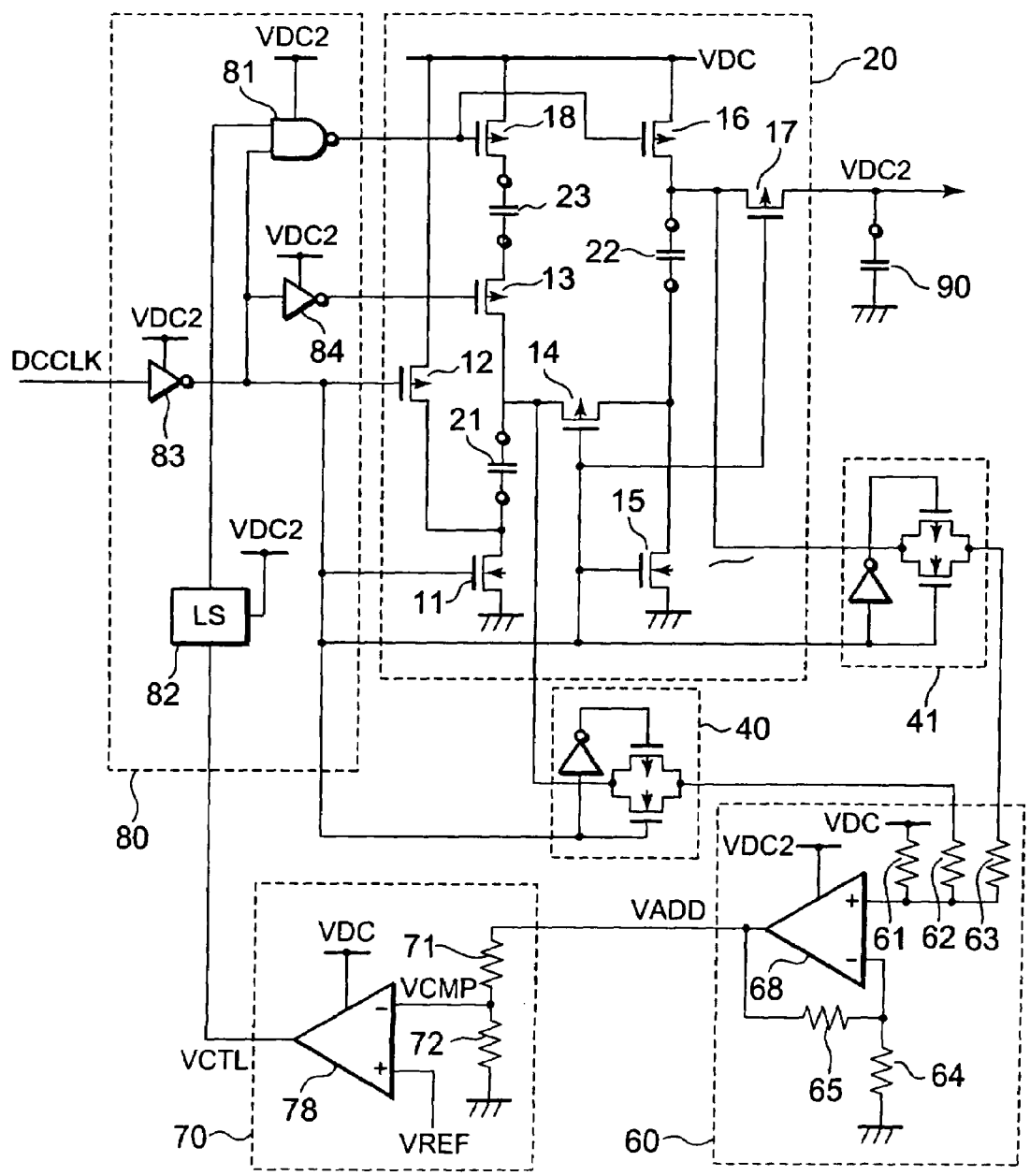
FIG. 13 is a circuit diagram of a power supply circuit in a fourth embodiment of the present invention.

FIG. 13 shows a circuit diagram of a power supply circuit in a fourth embodiment. This power supply circuit includes a voltage boosting circuit 30, an addition circuit 60, a comparison circuit 70, a control circuit 80, transfer gates 40 and 41, and a smoothing capacitor 90. The power supply circuit supplies an output voltage VDC2 to a load circuit (not shown).

The voltage boosting circuit 30 includes transistors 11 to 18 and voltage boosting capacitors 21 and 23. The transistor 11, 13, and 18 are switches for connecting the voltage boosting capacitors 21 and 22 serially and applying the supply voltage VDC to those capacitors 21 and 22, thereby charging them 21 and 22. The transistor 12 is a switch for boosting the charge in the voltage boosting capacitor 21 by connecting the supply voltage VDC serially to the capacitor 21. The transfer gate 40 includes two transistors and a NOT circuit. The transfer gate 40 functions as a switch for extracting the voltage VC1 from the voltage boosting capacitor 21. The transistors 15 and 16 are switches for charging voltage boosting capacitor 22 by applying the supply voltage VDC thereto. The transistor 14 is a switch for boosting the charge in the voltage boosting capacitor 22 with the charging voltage VC1 of the voltage boosting capacitor 21 and the supply voltage VDC. The transistor 17 is a switch for discharging the voltage boosting capacitor 22, thereby supplying the output voltage VDC2 to the smoothing capacitor 90. The transfer gate 41 includes two transistors and a NOT circuit and functions as a switch for extracting the voltage VC2 from the voltage boosting capacitor 22 that is being charged.

The addition circuit 60 includes an operation amplifier 68 and resistance elements 61 to 65. The addition circuit 60 adds up the voltage VC1 of the voltage boosting capacitor 21 extracted through the transfer gate 40, the voltage VC2 of the voltage boosting capacitor 22 extracted through the transfer gate 41, and the supply voltage VDC. The comparison circuit 70 includes a comparator 78 and resistance elements 71 and 72. The comparison circuit 70 compares the output voltage of the addition circuit 60 with a reference voltage VREF and outputs the comparison result to the control circuit 80. The control circuit 80 includes a NAND circuit 81, a level shift circuit 82, and NOT circuits 83 and 84. The control circuit 80 controls the on/off state of each of the transistors (switches) and the transfer gates 40 and 41 of the voltage boosting circuit 30 according to the voltage boosting clock DCCLK and the comparison result of the comparison circuit 70.

The output of the voltage boosting circuit 30 is smoothed by the smoothing capacitor 90 and the result is supplied to the load circuit. The smoothed output voltage VDC2 is also supplied to the NAND circuits 81, the level shift circuits 82, the NOT circuits 83 and 84 of the control circuit 80, as well as the operation amplifier 68 of the addition circuit 60, etc.

Next, there will be described the operation of the power supply circuit in this fourth embodiment.

At first, the output level of the comparison circuit 70 is assumed to be high. Then, when the level of the voltage boosting clock DCCLK is low, the NOT circuit 83 outputs a high level signal and the NAND circuit 81 outputs a low level signal, thereby the transistors 11, 13, 15, 16, and 18 are turned on and the transistors 12, 14, and 17 are turned off. Consequently, the voltage boosting capacitors 21 and 23 that are connected to each other serially through the transistor 13 are supplied the voltage VDC through the transistors 11 and 18, thereby those capacitors 21 and 23 are charged respectively. The voltage boosting capacitors 21 and 23 are charged up to a voltage of ½ of the supply voltage VDC respectively. The voltage boosting capacitor 22 is supplied the supply voltage VDC through the transistors 15 and 16 and charged up to the VDC.

At this time, the transfer gates 40 and 41 are on and outputs the voltages VC1 and VC2 of the voltage boosting capacitors 21 and 22 that are being charged to the addition circuit 60. At this time, the addition circuit 60 adds up the charging voltage VC1 of the voltage boosting capacitor 21, the charging voltage VC2 of the voltage boosting capacitor 22, and the supply voltage VDC, then outputs the output voltage VADD to the comparison circuit 70. In the comparison circuit 70, each of the resistance elements 71 and 72 divides the output voltage VADD and the comparator 68 compares each divided voltage VADD with a reference voltage VREF and outputs the comparison result to the control circuit 80. As described in the third embodiment, the control circuit 80 controls the on/off state of each of the transistors 16 and 16 according to the comparison result and adjust the charging voltages VC1 and VC2 so that the output voltage VDC2 becomes a desired voltage.

When the level of the voltage boosting clock DCCLK is high, the voltage boosting capacitors 21 and 22 are connected to each other serially through the transistor 14 and supply a voltage (supply voltage VDC+charging voltages VC1 and VC2) to the smoothing capacitor 90 through the transistor 17.

In such a way, the power supply circuit in this fourth embodiment uses three voltage boosting capacitors to generate a boosted output voltage that is 2.5 times the supply voltage VDC in maximum. Even this power supply circuit can obtain the same effect as each of those described above by adding up the voltages charged into the voltage boosting capacitors 21 and 22 at the time of charging and the supply voltage VDC and controlling the on/off states of the transistors 16 and 18 in accordance with the addition result.

Figure 14:
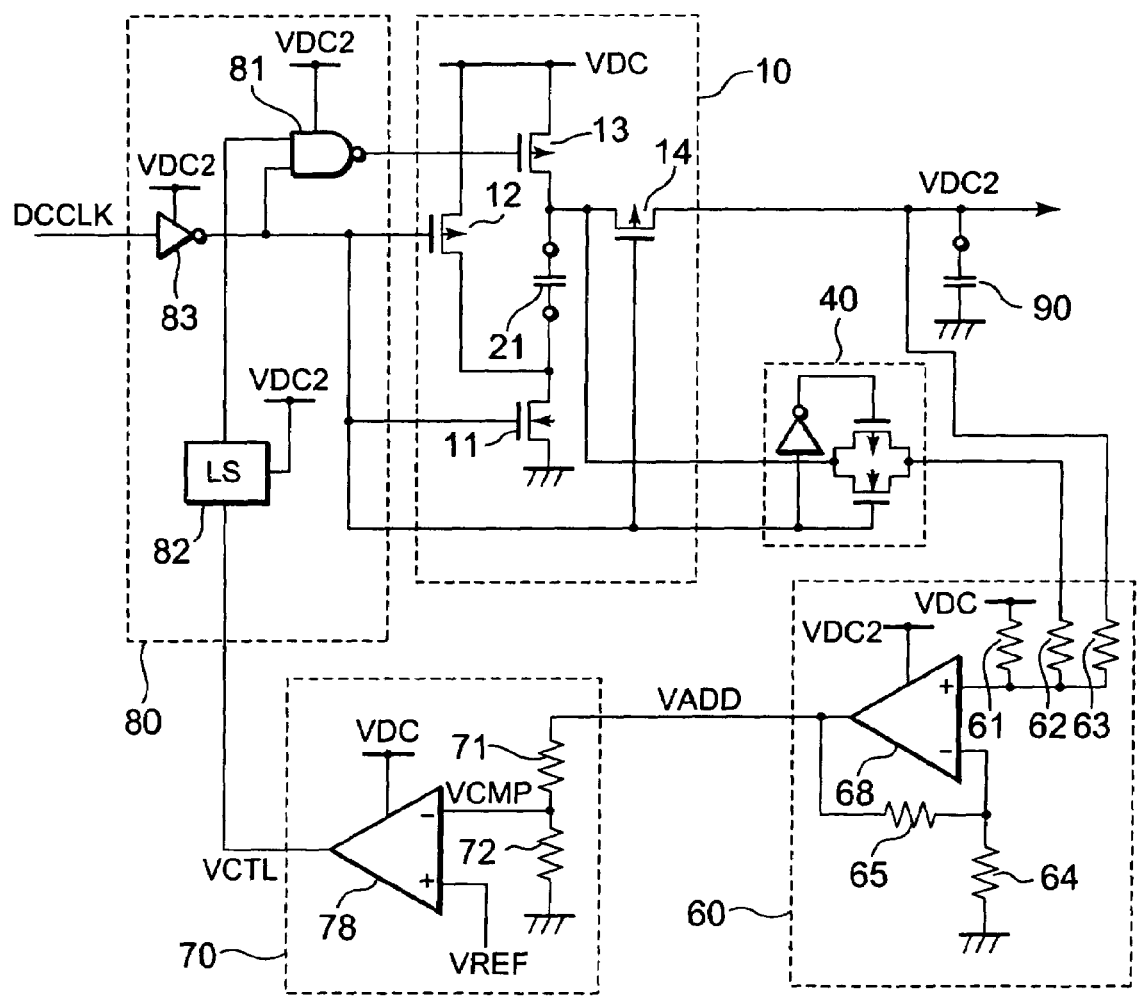
FIG. 14 is a circuit diagram of a power supply circuit in a fifth embodiment of the present invention.

Furthermore, there will be described a power supply circuit in a fifth embodiment with reference to FIG. 14. The power supply circuit in this fifth embodiment includes, as shown in FIG. 14, a voltage boosting circuit 10, an addition circuit 60, a comparison circuit 70, a control circuit 80, a transfer gate 40, and a smoothing capacitor 90. The power supply circuit supplies an output voltage VDC2 to a load circuit (not shown). The voltage boosting circuit 10, the comparison circuit 70, the control circuit 80, and the transfer gate 40 are the same as those in the first embodiment. The addition circuit 60 includes an operation amplifier 68 and resistance elements 61 to 65 and adds up the charging voltage VC of the voltage boosting capacitor 21, the supply voltage VDC, and the output voltage VDC2 of the voltage boosting circuit 10.

If the resistance values of the resistance elements 61 to 65 are defined as R61 to R65 and R61=R62=R63 is satisfied here, then the output VADD of the addition circuit 60 can be calculated as follows.

$$VADD=(1+R65/R64)\times(VC+VDC+VDC2)/3 \quad (7)$$

The comparison circuit 70 obtains a comparison voltage VCMP by dividing the output VADD of the addition circuit 60 through each of the resistance elements 71 and 72. If the resistance values of the resistance elements 71 and 72 are defined as R71 and R72 respectively, the comparison voltage VCMP can be calculated as follows.

$$VCMP=VADD\times R72/(R71+R72) \quad (8)$$

Consequently, the comparison circuit 70 outputs a high level signal at VCMP<VREF and outputs a low level signal at VCMP≧VREF. When the comparison circuit 70 outputs a high level signal, the NAND circuit 81 of the control circuit 80 outputs a low level signal, thereby the charging is continued. When the comparison circuit 70 outputs a low level signal, the NAND circuit 81 of the control circuit 80 outputs a high level signal, thereby the transistor 13 is turned off and charging of the voltage capacitor 21 stops.

When the level of voltage boosting clock DCCLK is high, the transistors 11 and 13 are turned off and the transistors 12 and 14 are turned on. Thus the voltage VC+VDC=VDC2 is supplied to the smoothing capacitor 90. If the desired boosted output voltage value is defined as V2 and the difference from the output voltage VDC2 (a deficiency of VDC2) is assumed to be ΔV(=V2−VDC2), the following equality is satisfied.

$$V2+\Delta V=VC+VDC \quad (9)$$

Consequently, the ΔV can be compensated. If an adjustment is made on this condition so as to satisfy VCMP=VREF, therefore, the desired voltage V2 is obtained. And the following calculation is possible with the formulas (7) to (9).

$$(1+R65/R64)\times2\times V2/3=VREF\times(R71+R72)/R72 \quad (10)$$

Consequently, by selecting R71, R72, R64, and R65 so as to satisfy the formula (10), the charging voltage VC of the voltage boosting capacitor 21 is adjusted so as to satisfy VDC2=V2.

Figure 15:
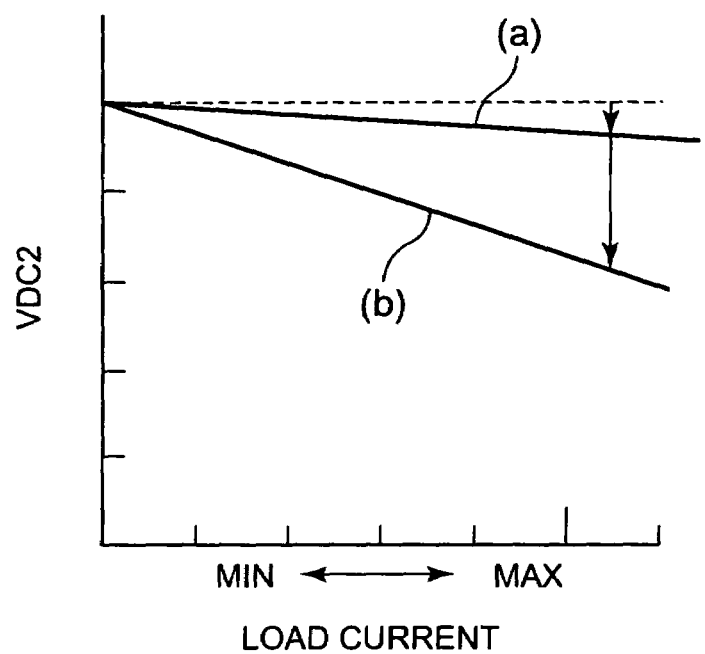
FIG. 15 is a diagram for showing a relationship between a load current and a boosted output voltage.

In the first to fourth embodiments, a voltage to be charged in each voltage boosting capacitor is decided free from influences of the boosted output voltage VDC2. In this fifth embodiment, however, because the output voltage VDC2 is added up during a charging period, the voltage boosting capacitor 21 is kept charged until the charging voltage VC rises to compensate the falling of the output voltage VDC2 as shown in the formula (9). Consequently, the output voltage VDC2 is kept at a voltage nearer to the desired voltage value V2. FIG. 15 shows a relationship between the load current and the boosted output voltage. FIG. 15A denotes the property of the power supply circuit shown in FIG. 14 and FIG. 15B denotes the property of the power supply circuit shown in FIG. 7. It would be understood from those facts that the power supply circuit in this fifth embodiment can prevent lowering of the boosted output voltage to be caused by a load current more effectively and the power supply is assumed as a voltage boosting circuit with higher performance.

As described above, in the case of the charge pump voltage boosting power supply circuit, the voltage of each voltage boosting capacitor is monitored while it is being charged and the on/off state of each switch is controlled according to the voltage. The power supply circuit can thus generate a predetermined output voltage that never exceeds the element breakdown voltage in a wide range of supply voltages (from low to high voltages). Furthermore, because switches are controlled only in the charging period, no random noise is superposed on the boosted output voltage. Consequently, it is possible to eliminate horizontal stripes that otherwise might appear on the display screen due to the noise. And because the boosted output voltage is also monitored, this fifth embodiment can realize a voltage boosting circuit that can prevent falling of the boosted output voltage that might occur due to a load current, thereby realizing high current supply performance.

Figure 16A:
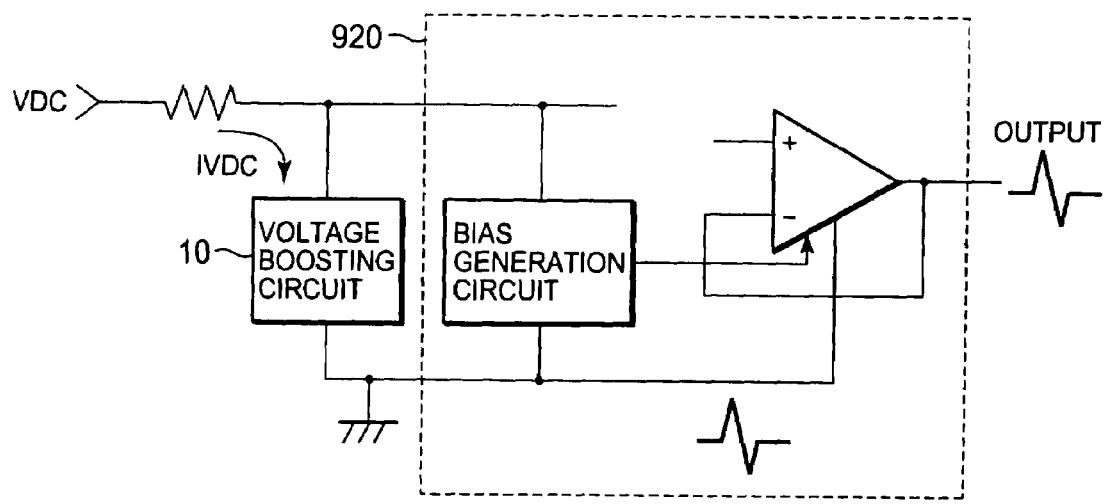
FIG. 16A to 16B is a diagram for describing a charging current of a source driver circuit.
Figure 16B:
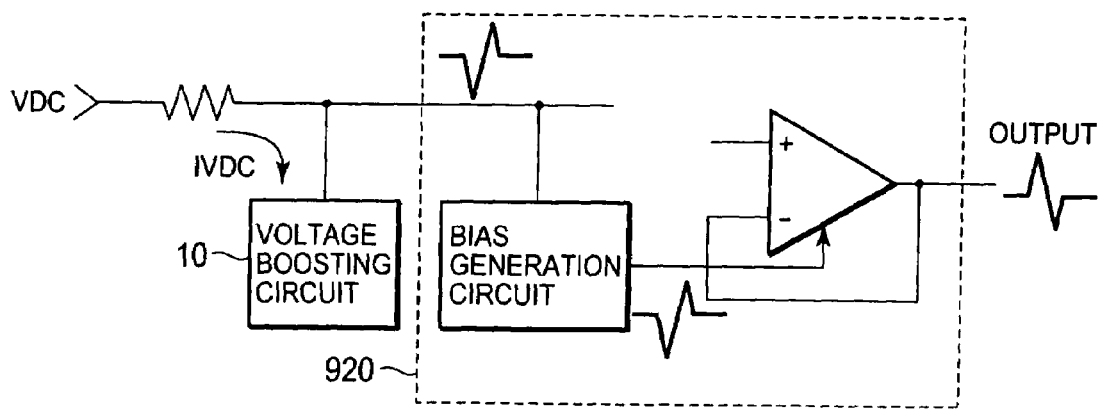

In order to realize such high performance, it will be effective to reduce the on-resistance of each transistor in each voltage boosting circuit. In this case, a large current comes to flow in each transistor at the start of charging in the subject voltage boosting capacitor. In other words, as shown in FIG. 16A, a current IVDC flows from the power supply (voltage VDC) into the voltage boosting circuit 10, so that the power supply voltage supplied to the voltage boosting circuit 10 and the source driver 920, as well as the ground voltage come to be varied due to the influence of the resistance of the power supply line. Furthermore, as shown in FIG. 16B, because the supply voltage is varied in such a way, the output of a bias generation circuit included in the source driver 902 is also varied and the variation affects the output of the source driver 20.

Figure 17A:
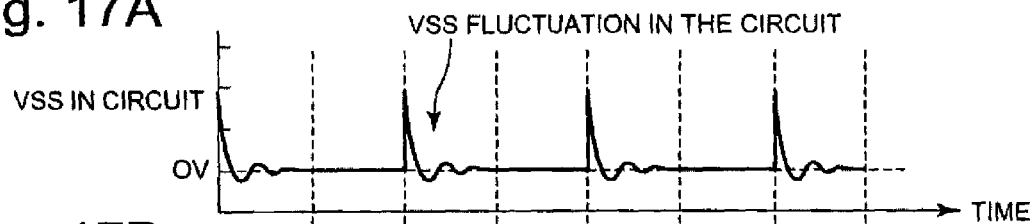
FIGS. 17A to 17F are diagrams for describing a fluctuation of each of a supply voltage VDC and a ground voltage VSS upon charging a conventional power supply circuit.
Figure 17B:
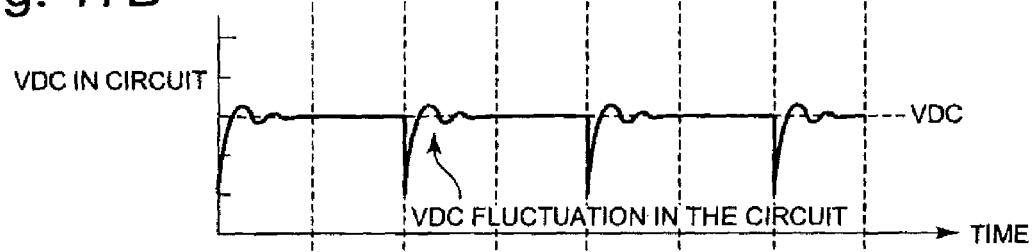
Figure 17C:
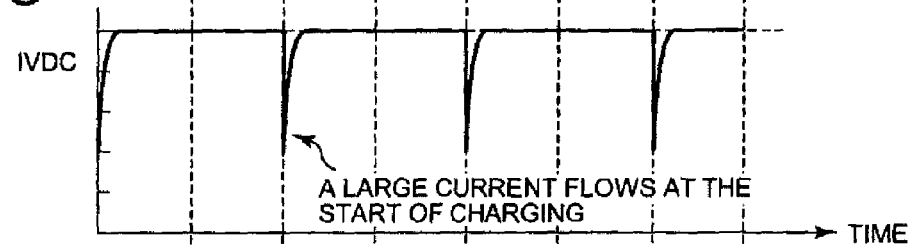
Figure 17D:
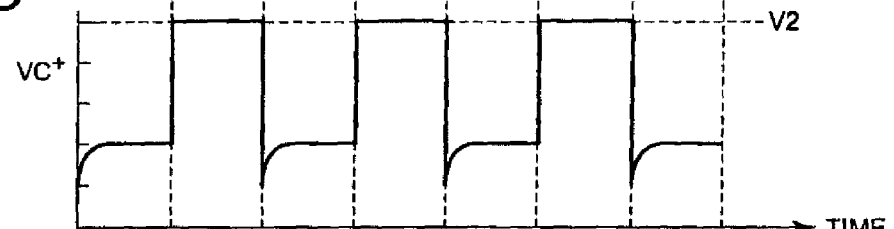
Figure 17E:
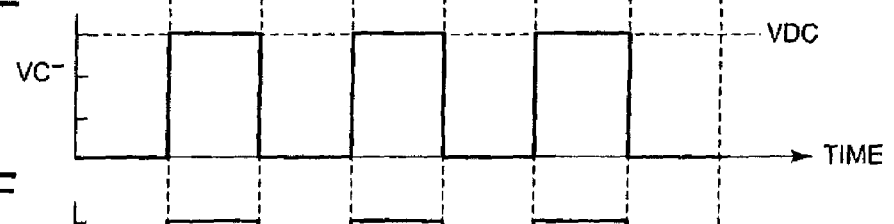
Figure 17F:
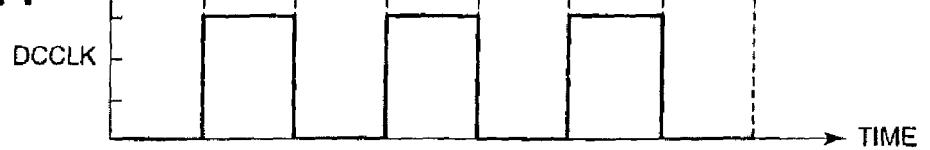

For example, the voltage in the voltage boosting circuit 10 varies as shown in FIGS. 17A to 17F. FIG. 17A shows a ground voltage in the circuit of the source driver 920, FIG. 17B shows a power supply voltage VDC in the circuit of the source driver 920, and FIG. 17C shows a current IVDC flowing into the voltage boosting circuit 10. As shown clearly in those figures, the voltages and current are varied significantly synchronously with the voltage boosting clock DCCLK (FIG. 17F). FIG. 17D shows a voltage VC+ of the power supply side node of the voltage boosting capacitor and FIG. 17E shows a voltage VC− of the ground side node thereof. As shown clearly in those figures, a large current (IVDC) flows in the voltage boosting capacitor at the start of charging. In such a way, if the supply voltage VDC and the ground voltage VSS are varied significantly, the variation causes the output of the source driver 920 to be varied and the image quality to be degraded with unnecessary horizontal stripes to be displayed on the screen. Such causes of the image quality degradation must be eliminated.

Figure 18:
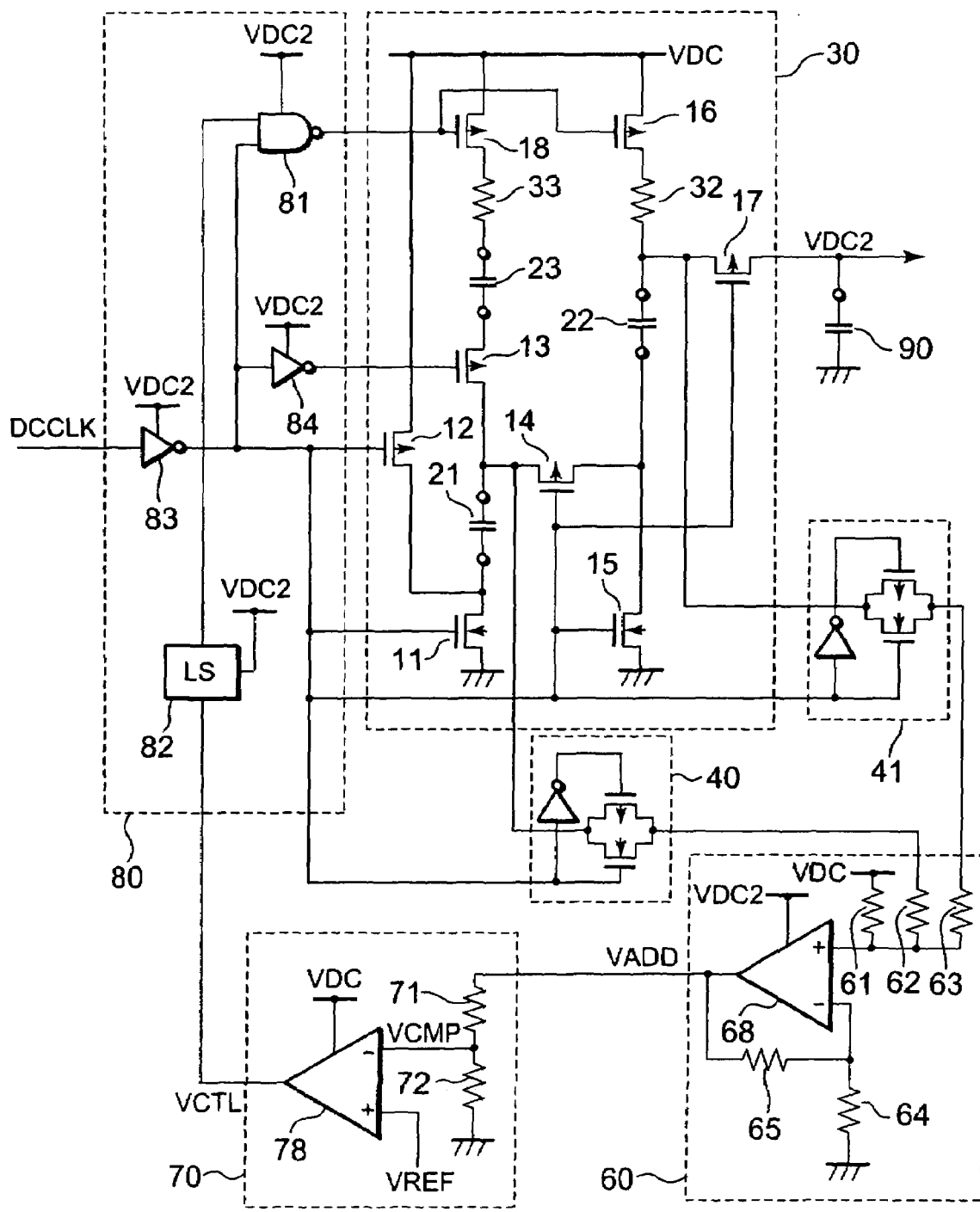
FIG. 18 is a circuit diagram of a power supply circuit in a sixth embodiment of the present invention.

FIG. 18 shows a circuit diagram of a power supply circuit in a sixth embodiment. This power supply circuit includes a voltage boosting circuit 30, an addition circuit 60, a comparison circuit 70, a control circuit 80, transfer gates 40 and 41, and a smoothing capacitor 90. The power supply circuit supplies an output voltage VDC2 to a load circuit (not shown). This power supply circuit is almost the same in configuration as that in the fourth embodiment. There is only a difference between those embodiments; resistance elements are added newly to the voltage boosting circuit 30 in this sixth embodiment. The voltage boosting circuit 30 inserts a resistance element 33 between a transistor 18 and the voltage boosting capacitor 23 and another resistance element 32 between a transistor 16 and a voltage boosting capacitor 22.

Consequently, the voltage boosting circuit 30 comes to include transistors 11 to 18, voltage boosting capacitors 21 to 23, and resistance elements 32 to 33. The transistors 11, 13, and 18 are switches for connecting the voltage boosting capacitors 21 and 23 to each other serially and charging those capacitors 21 and 23 with a supply voltage VDC. The resistance element 33 connected between the transistor 18 and the voltage boosting capacitor 23 limits the current flow for charging the voltage boosting capacitors 21 and 23. The transistor 12 is a switch for connecting the supply voltage VDC serially to the voltage boosting capacitor 21 to boost the charge therein. The transfer gate 40 includes two transistors and a NOT circuit. The transfer gate 40 is a switch for extracting the voltage VC1 from the voltage boosting capacitor 21 that is being charged. The transistors 15 and 16 are switches for charging the voltage boosting capacitor 22 by applying the supply voltage VDC thereto. The resistance element 32 connected between the transistor 16 and the voltage boosting capacitor 22 limits the current flow for charging the voltage boosting capacitor 22. The transistor 14 is a switch for connecting the voltage boosting capacitor 22 serially to the voltage boosting capacitor 21 so as to boost the charge in the voltage boosting capacitor 22 with the charging voltage VC1 of the voltage boosting capacitor 21 and the supply voltage VDC. The transistor 17 is a switch for discharging the charge from the voltage boosting capacitor 22 and supplying an output voltage VDC2 to the smoothing capacitor 90. The transfer gate 41 includes two transistors and a NOT circuit and functions as a switch for extracting the VDC2 from the voltage boosting capacitor 22 that is being charged.

The addition circuit 60 includes an operation amplifier 68 and resistance elements 61 to 65 and adds up the voltage VC1 of the voltage boosting capacitor 21 extracted through the transfer gate 40, the voltage VC2 of the voltage boosting capacitor 22 extracted through the transfer gate 41, and the supply voltage VDC. The comparison circuit 70 includes a comparator 78 and resistance elements 71 and 72 and compares the output voltage of the addition circuit 60 with a reference voltage VREF. The comparison result is output to the control circuit 80. The control circuit 80 includes a NAND circuit 81, a level shift circuit 82, and NOT circuits 83 and 84. The control circuit 80 controls the on/off state of each of the transistors (switches) and the transfer gates 40 and 41 of the voltage boosting circuit 30 according to the voltage boosting clock DCCLK and the comparison result of the comparison circuit 70.

The output of the voltage boosting circuit 30 is smoothed by the smoothing capacitor 90 and the result is supplied to the load circuit. The smoothed voltage VDC2 is also supplied to the NAND circuit 81, the level shift circuit 82, and the NOT circuits 83 and 84 of the control circuit 80, as well as the operation amplifier 68 of the addition circuit 60, etc.

Next, there will be described the operation of the power supply circuit in this sixth embodiment.

At first, the output level of the comparison circuit 70 is assumed to be high. Then, when the level of the voltage boosting clock DCCLK is low, the NOT circuit 83 outputs a high level signal and the NAND circuit 81 outputs a low level signal, thereby the transistors 11, 13, 15, 16, and 18 are turned on and the transistors 12, 14, and 17 are turned off. Consequently, the voltage boosting capacitors 21 and 23 that are connected to each other serially through the transistor 13 are supplied the voltage VDC through the transistors 11 and 18 and the resistance element 33, thereby the capacitors 21 and 23 are charged respectively. The voltage boosting capacitors 21 and 23 are charged up to a voltage of ½ of the supply voltage VDC respectively. At this time, the resistance element 33 limits the current for charging the voltage boosting capacitors 21 and 23. The voltage boosting capacitor 22 is supplied the supply voltage VDC through the transistors 15 and 16 and the resistance element 33 to be charged up to the VDC. At this time, the resistance element 32 limits the current for charging the voltage boosting capacitor 22. Here, while the resistance elements 32 and 33 are described as independent elements, the on-resistance of the transistors 16 and 18 may be used instead of those elements 32 and 33. In other words, it is possible to use the transistors 16 and 18 instead of the resistance elements 32 and 33 to adjust their on-resistance to flow a predetermined current.

At this time, the transfer gates 40 and 41 are on and outputs the voltages VC1 and VC2 of the voltage boosting capacitors 21 and 22 that are being charged respectively to the addition circuit 60. The addition circuit 60 then adds up the charging voltage VC1 of the voltage boosting capacitor 21, the charging voltage VC2 of the voltage boosting capacitor 22, and the supply voltage VDC and outputs the output voltage VADD to the comparison circuit 70. In the comparison circuit 70, the resistance elements 71 and 72 function to divide the output voltage VADD respectively and the comparison circuit 70 compares each divided voltage VADD with a reference voltage VREF and outputs the comparison result to the control circuit 80. As described in the third embodiment, the control circuit 80 controls the on/off state of each of the transistors 16 and 18 according to the comparison result and adjust the charging voltages VC1 and VC2 so that the output voltage VDC2 becomes a desired voltage.

When the level of the voltage boosting clock DCCLK is high, the voltage boosting capacitors 21 and 22 are connected to each other serially through the transistor 14, thereby a voltage (supply voltage VDC+charging voltages VC1 and VC2) is supplied to the smoothing capacitor 90 through the transistor 17.

Figure 19A:
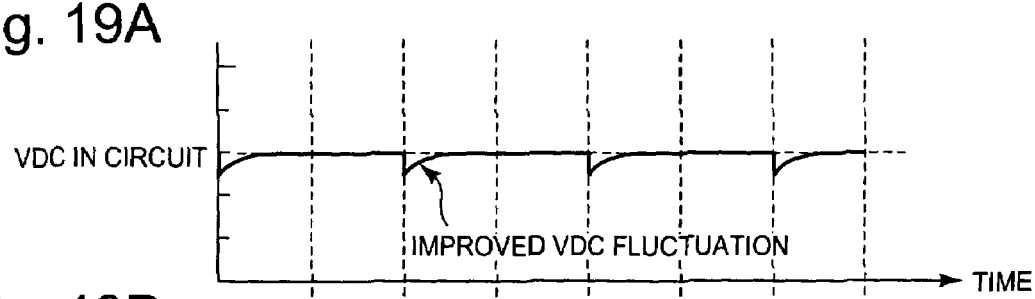
FIGS. 19A to 19E are diagrams for showing an example of the supply voltage VDC at the time of charging in the sixth embodiment of the present invention.
Figure 19B:
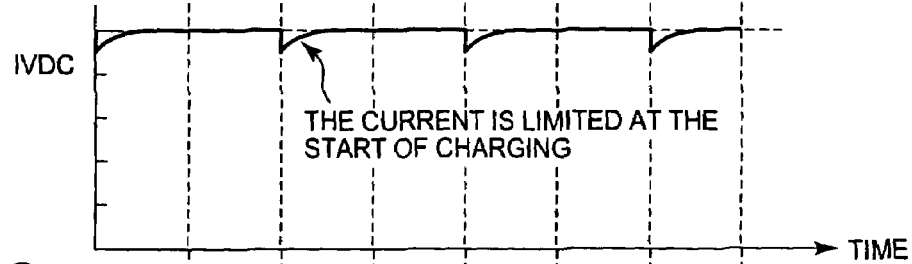
Figure 19C:
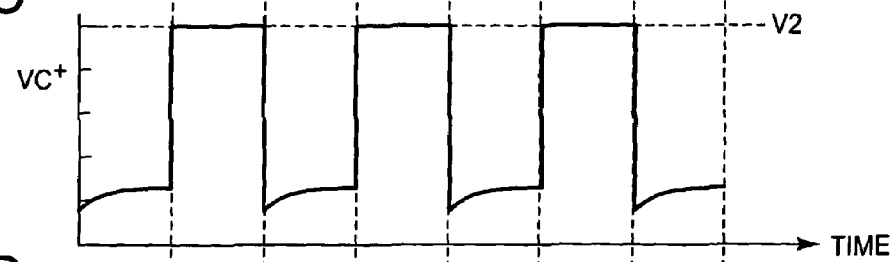
Figure 19D:
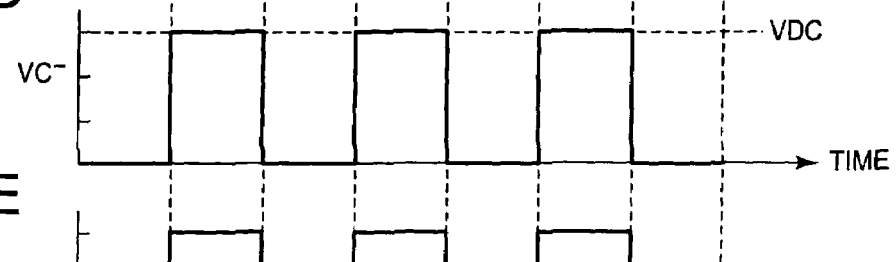
Figure 19E:
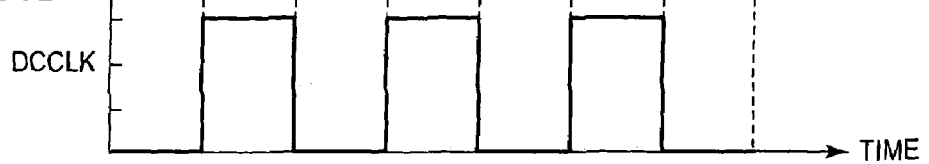

In such a way, the power supply circuit described in the fourth embodiment are provided with the resistance elements 32 and 33 for limiting the supply current IVDC for charging respectively in this sixth embodiment. Consequently, as shown in FIGS. 19A to 19E, the change of the current (FIG. 19B) is eased upon charging the voltage boosting capacitors 21 to 23 and the variation of the supply voltage VDC is suppressed (FIG. 19A). Here, the power supply circuit is described on the basis of that in the fourth embodiment, the variation of the supply voltage VDC can also be suppressed similarly in the power supply circuits in other embodiments.

Figure 20:
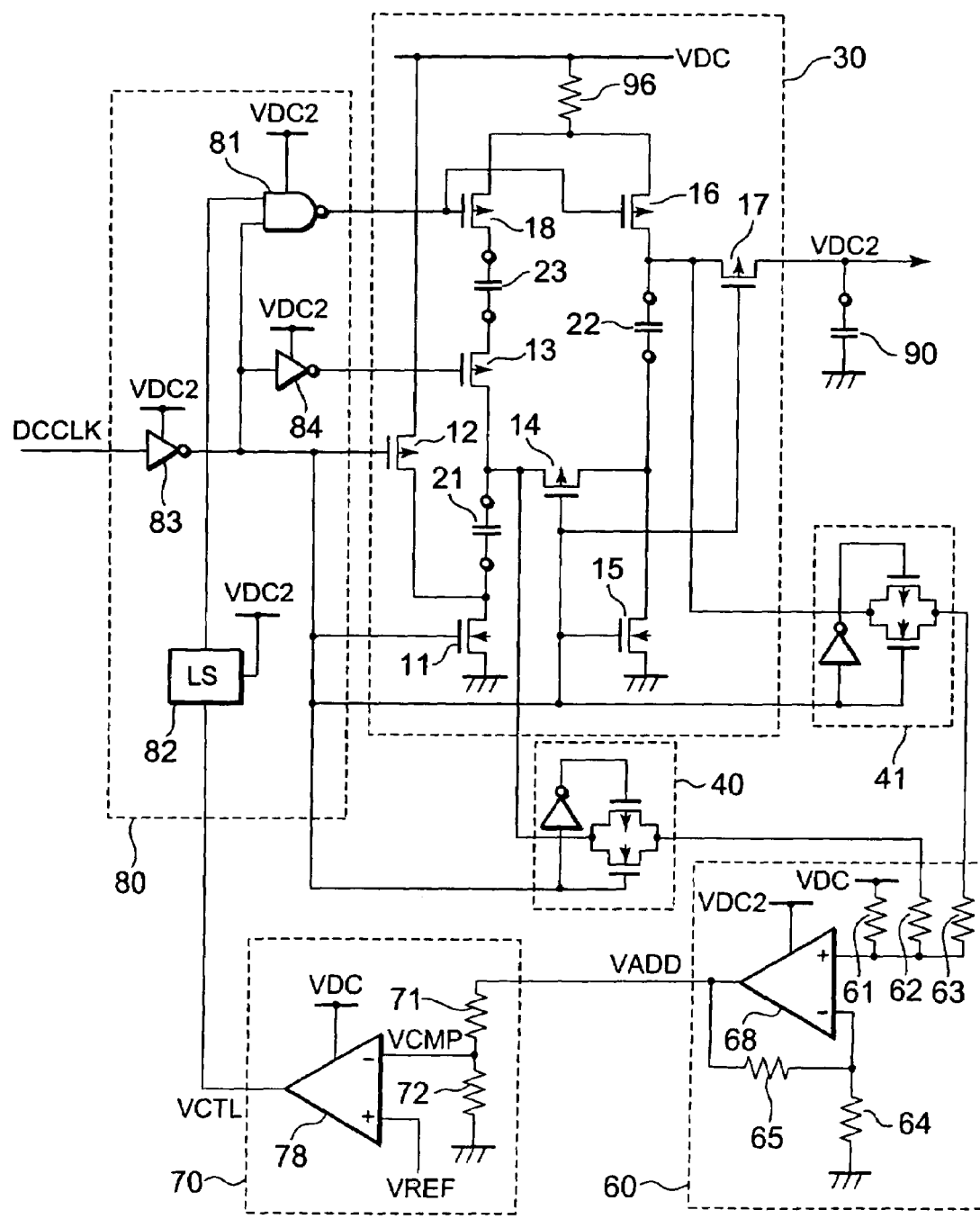
FIG. 20 is a circuit diagram of a power supply circuit in a seventh embodiment of the present invention.

FIG. 20 shows a circuit diagram of a power supply circuit in a seventh exemplary embodiment. This power supply circuit includes a voltage boosting circuit 30, an addition circuit 60, a comparison circuit 70, a control circuit 80, transfer gates 40 and 41, and a smoothing capacitor 90. The power supply circuit supplies an output voltage VDC2 to a load circuit (not shown). This power supply circuit is almost the same in configuration as that in the fourth exemplary embodiment. There is only a difference between those embodiments; a resistance element is added newly to the voltage boosting circuit 30 in this seventh embodiment. The voltage boosting circuit 30 inserts the resistance element 96 between the transistor 18/16 and the supply voltage VDC.

Consequently, the voltage boosting circuit 30 comes to include transistors 11 to 18, voltage boosting capacitors 21 to 23, and a resistance element 96. The transistors 11, 13, and 18 are switches for connecting the voltage boosting capacitors 21 and 23 to each other serially and apply a supply voltage VDC to those capacitors 21 and 23 through the resistance element 96, thereby charging those capacitors 21 and 23. The transistor 12 is a switch for connecting the supply voltage VDC serially to the voltage boosting capacitor 21 to boost the charge therein. The transfer gate 40 includes two transistors and a NOT circuit. The transfer gate 40 is a switch for extracting the voltage VC1 from the voltage boosting capacitor 21 that is being charged. The transistors 15 and 16 are switches for charging the voltage boosting capacitor 22 by applying the supply voltage VDC thereto through the resistance element 96. The resistance element 96 limits the current flow for charging the voltage boosting capacitors 21 to 23. The transistor 14 is a switch for connecting the voltage boosting capacitor 22 serially to the voltage boosting capacitor 21 so as to boost the charge in the voltage boosting capacitor 22 with the charging voltage VC1 of the voltage boosting capacitor 21 and with the supply voltage VDC. The transistor 17 is a switch for discharging the charge from the voltage boosting capacitor 22 and supplying an output voltage VDC2 to the smoothing capacitor 90. The transfer gate 41 includes two transistors and a NOT circuit and functions as a switch for extracting the VDC2 from the voltage boosting capacitor 22 that is being charged.

The addition circuit 60 includes an operation amplifier 68 and resistance elements 61 to 65 and adds up the voltage VC1 of the voltage boosting capacitor 21 extracted through the transfer gate 40, the voltage VC2 of the voltage boosting capacitor 22 extracted through the transfer gate 41, and the supply voltage VDC. The comparison circuit 70 includes a comparator 78 and resistance elements 71 and 72 and compares the output voltage of the addition circuit 60 with a reference voltage VREF. The comparison result is output to the control circuit 80. The control circuit 80 includes a NAND circuit 81, a level shift circuit 82, and NOT circuits 83 and 84. The control circuit 80 controls the on/off state of each of the transistors (switches) and the transfer gates 40 and 41 of the voltage boosting circuit 30 according to the voltage boosting clock DCCLK and the comparison result of the comparison circuit 70.

The output of the voltage boosting circuit 30 is smoothed by the smoothing capacitor 90 and the result is supplied to the load circuit. The smoothed voltage VDC2 is also supplied to the NAND circuit 81, the level shift circuit 82, and the NOT circuits 83 and 84 of the control circuit 80, as well as the operation amplifier 68 of the addition circuit 60, etc.

Next, there will be described the operation of the power supply circuit in this seventh embodiment.

At first, the output level of the comparison circuit 70 is assumed to be high. Then, when the level of the voltage boosting clock DCCLK is low, the NOT circuit 83 outputs a high level signal and the NAND circuit 81 outputs a low level signal, thereby the transistors 11, 13, 15, 16, and 18 are turned on and the transistors 12, 14, and 17 are turned off. Consequently, the voltage boosting capacitors 21 and 23 that are connected to each other serially through the transistor 13 are supplied the voltage VDC through the transistors 11 and 18 and the resistance element 96, thereby the capacitors 21 and 23 are charged. At this time, the voltage boosting capacitors 21 and 23 are charged up to a voltage of ½ of the supply voltage VDC respectively. The resistance element 96 limits the current flow for charging the voltage boosting capacitors 21 and 23. The voltage boosting capacitor 22 is supplied the supply voltage VDC through the transistors 15 and 16 and the resistance element 96, thereby the capacitor 22 is charged up to the VDC. At this time, the resistance element 96 limits the current flow for charging the voltage boosting capacitor 22, thereby the variation of the supply voltage VDC that might occur due to the charging current at the start of charging is suppressed.

At this time, the transfer gates 40 and 41 are on and outputs the voltages VC1 and VC2 of the voltage boosting capacitors 21 and 22 that are being charged respectively to the addition circuit 60. The addition circuit 60 then adds up the charging voltage VC1 of the voltage boosting capacitor 21, the charging voltage VC2 of the voltage boosting capacitor 22, and the supply voltage VDC and outputs the output voltage VADD to the comparison circuit 70. In the comparison circuit 70, the resistance elements 71 and 72 function to divide the output voltage VADD respectively and the comparison circuit 70 compares each divided voltage VADD with the reference voltage VREF and outputs the comparison result to the control circuit 80. As described in the third embodiment, the control circuit 80 also controls the on/off state of each of the transistors 16 and 18 according to the comparison result and adjust the charging voltages VC1 and VC2 so that the output voltage VDC2 reaches a desired voltage.

When the level of the voltage boosting clock DCCLK is high, the voltage boosting capacitors 21 and 22 are connected to each other serially through the transistor 14, thereby a voltage (supply voltage VDC+charging voltages VC1 and VC2) is supplied to the smoothing capacitor 90 through the transistor 17.

Figure 21:
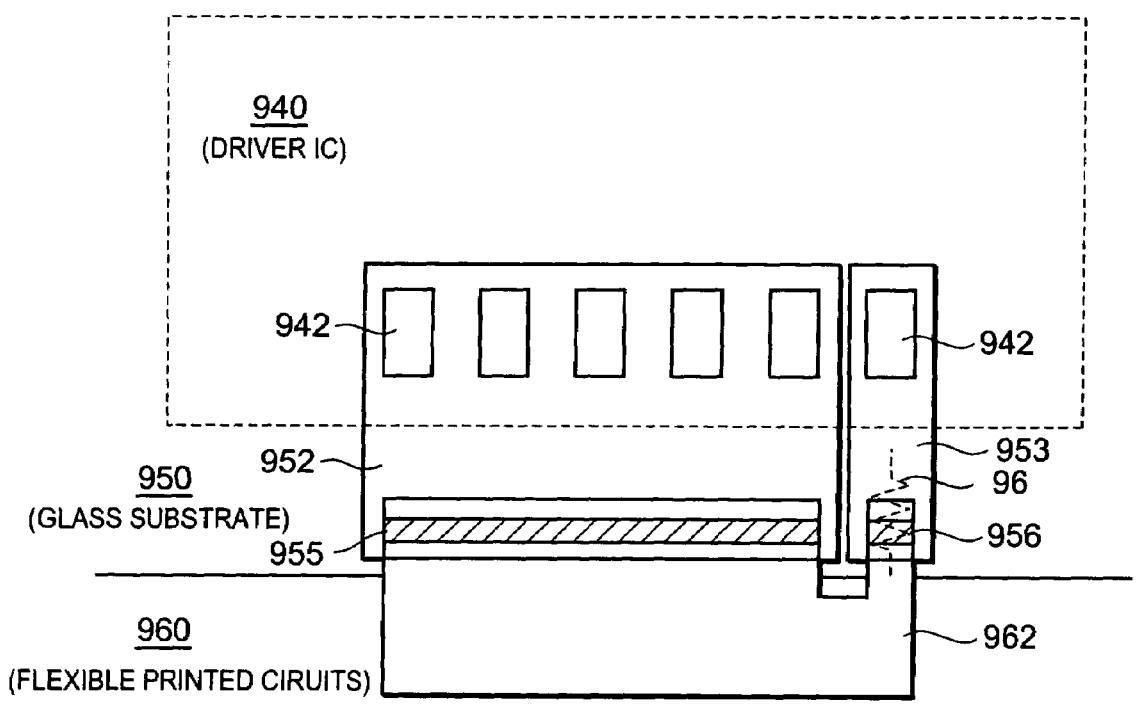
FIG. 21 is a diagram for showing an example for mounting a resistor in the seventh embodiment of the present invention.

The liquid crystal display driver IC 940 that employs this power supply circuit, as shown in FIG. 21, is mounted on a glass substrate 950. A power is supplied to the liquid crystal display driver IC 940 through a flexible printed circuits 960. A power supply line 962 provided on the flexible printed circuits 960 is connected to power lines 952 and 953 provided on the glass substrate 950 at junctions 955 and 956. The liquid crystal display driver IC 940 includes a bump 942 and the driver IC 940 is connected to the power lines 952 and 953 provided on the glass substrate 950 through the bump 942. Consequently, the connection resistance related to a power supply is determined by the number of bumps 942, the width of the power line 952/953 provided on the glass substrate 950, and the connection resistance of the junction 955/956.

In other words, as shown in FIG. 21, because the lines on the glass substrate 950 are classified into the power line 952 and the power line 953, the resistance value can be changed. When the power line 952 is extremely thick and the number of bumps 942 increases, the resistance value can be set almost at zero. On the other hand, the width of the line 953 and the number of bumps 942 are adjusted so as to obtain a resistance value equivalent to that of the resistance element 96. Consequently, a power is supplied to the transistor 12 through the power line 952 while the resistance is almost zero and a power comes to be supplied to the transistors 16 and 18 through the power line 953 at a resistance value equivalent to that of the resistance element 96. In such a way, the line resistor can be used instead of the resistance element 96. In other words, the number of resistance elements can also be reduced by utilizing the packaging properties. Here, although the description has been made on the basis of the power supply circuit in the fourth embodiment, the reduction of the number of resistance elements, etc. described here may be achieved similarly for the circuits in other embodiments.

Figure 22:
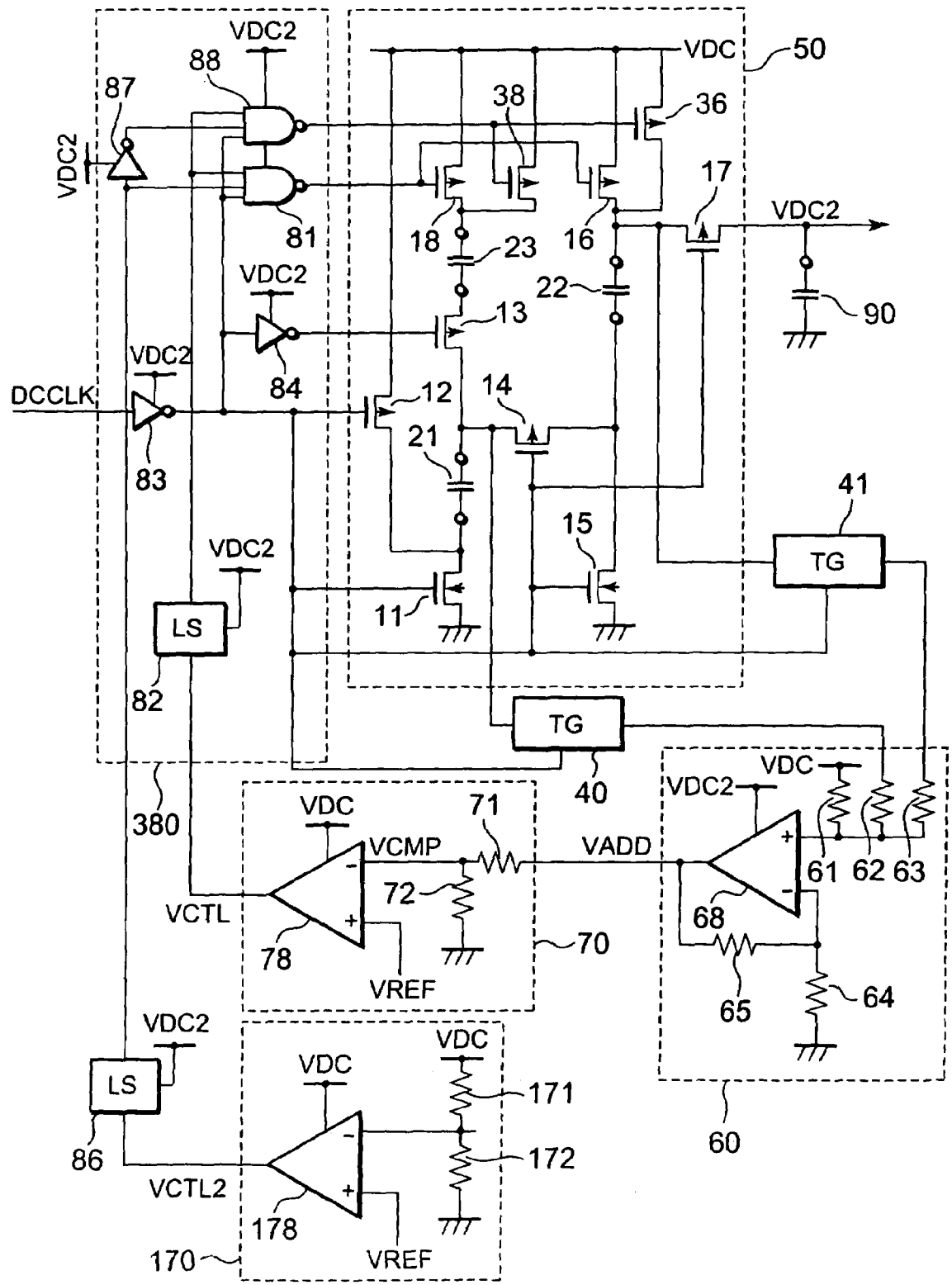
FIG. 22 is a circuit diagram of a power supply circuit in an eighth embodiment of the present invention.

FIG. 22 shows a circuit diagram of a power supply circuit in an eighth exemplary embodiment. This power supply circuit includes a voltage boosting circuit 50, an addition circuit 60, a comparison circuit 170, a control circuit 380, transfer gates 40 and 41, and a smoothing capacitor 90. The power supply circuit supplies an output voltage VDC2 to a load circuit (not shown). This power supply circuit differs in configuration from that described in the fourth embodiment; in this eighth embodiment, transistors 36 and 38 are connected to each other in parallel to the transistors 16 and 18 for charging the voltage boosting capacitors 21 to 23 provided in the voltage boosting circuit 30 and a comparison circuit 170 is newly added to control the operations of those transistors 36 and 38 and a gate circuit is added to the control circuit 380.

The voltage boosting circuit 50 includes transistors 11 to 18, as well as 36 and 38 and voltage boosting capacitors 21 to 23. The transistors 16 and 36 are connected to each other in parallel while the transistors 18 and 38 are connected in parallel. The transistors 11, 13, and 18/38 are switches for connecting the voltage boosting capacitors 21 and 23 to each other serially and charge those capacitors 21 and 23 by applying a supply voltage VDC thereto. The transistor 12 is a switch for connecting the supply voltage VDC serially to the voltage boosting capacitor 21 to boost the charge therein. The transfer gate 40 includes two transistors and a NOT circuit. The transfer gate 40 is a switch for extracting the voltage VC1 from the voltage boosting capacitor 21 that is being charged. The transistors 15 and 16/36 are switches for charging the voltage boosting capacitor 22 by applying the supply voltage VDC thereto. The transistor 14 is a switch for connecting the voltage boosting capacitor 22 serially to the voltage boosting capacitor 21, thereby boosting the charge in the capacitor 22 with the charging voltage VC1 of the voltage boosting capacitor 21 and the supply voltage VDC. The transistor 17 is a switch for discharging the charge from the voltage boosting capacitor 22 and supplying an output voltage VDC2 to the smoothing capacitor 90. The transfer gate 41 includes two transistors and a NOT circuit and functions as a switch for extracting the VDC2 from the voltage boosting capacitor 22 that is being charged.

The addition circuit 60 includes an operation amplifier 68 and resistance elements 61 to 65 and adds up the voltage VC1 of the voltage boosting capacitor 21 extracted through the transfer gate 40, the voltage VC2 of the voltage boosting capacitor 22 extracted through the transfer gate 41, and the supply voltage VDC. The comparison circuit 70 includes a comparator 78 and resistance elements 71 and 72 and compares the output voltage of the addition circuit 60 with a reference voltage VREF. The comparison result VCTL is output to the control circuit 380. The comparison circuit 170 includes a comparator 178, as well as resistance elements 171 and 172 and compares the supply voltage VDC with the reference voltage VREF. The comparison result VCTL2 is output to the control circuit 380. The supply voltage compared in the comparison circuit 170 should preferably be free from the influence of the voltage drop to be caused by a charging current and the comparison should preferably be made for a voltage around the input end of the supply voltage VDC in this power supply circuit.

The control circuit 380 includes NAND circuits 81 and 88, level shift circuits 82 and 86, and NOT circuits 83, 84, and 87. The control circuit 380 controls the on/off state of each of the transistors (switches) and the transfer gates 40 and 41 of the voltage boosting circuit 50 according to the voltage boosting clock DCCLK and the comparison result of the comparison circuit 70/170. The output VCTL2 of the comparison circuit 170 drives the NAND circuits 81 and 88 exclusively. In other words, the output VCTL2 validates the NAND 81 when the supply voltage VDC is lower than the predetermined voltage and validates the NAND circuit 88 when the supply voltage VDC is higher than the predetermined voltage. When the NAND circuit 81 is validated, the transistors 18 and 16 are turned on. When the NAND circuit 88 is validated, the transistors 38 and 36 are turned on. If the on-resistance of the transistors 38 and 36 is set larger than the on-resistance of the transistors 18 and 16, the charging current can be limited when the transistors 38 and 36 are turned on.

The output of the voltage boosting circuit 50 is smoothed by the smoothing capacitor 90 and the result is supplied to the load circuit. The smoothed voltage VDC2 is also supplied to the NAND circuits 81 and 88, the level shift circuits 82 and 86, and the NOT circuits 83, 84, and 87 of the control circuit 380, as well as the operation amplifier 68 of the addition circuit 60, etc.

Next, there will be described the operation of the power supply circuit in this eighth embodiment.

In the comparison circuit 170, the comparator 178 compares a voltage obtained by dividing the supply voltage VDC through each of the resistance elements 171 and 172 with a reference voltage VREF and outputs the comparison result VCTL2. In other words, the comparison result VCTL2, which denotes whether the supply voltage VDC is higher or lower than the predetermined voltage, is output to the control circuit 380 through the level shift circuit 86. Here, the comparison result VCTL2 denotes the low level when the supply voltage VDC is higher than the predetermined voltage and the comparison result VCTL2 denotes the high level when the supply voltage VDC is lower than the predetermined voltage.

On the other hand, in the control circuit 380, each of the NAND circuits 81 and 88 works exclusively as a selection circuit that receives the comparison result VCTL2 as a selection signal. Consequently, when the comparison result VCTL2 denotes the high level, the NAND circuit 81 side circuit is validated. When the supply voltage VDC denotes the low level, the NAND circuit 88 side circuit is validated. When the comparison result VCTL2 denotes the high level, that is, when the supply voltage VDC is lower than the predetermined voltage, the NAND circuit 81 is validated to drive the transistors 18 and 16, thereby this power supply circuit works as described in the fourth embodiment. And when the comparison result VCTL2 denotes the low level, that is, when the supply voltage VDC is higher than the predetermined voltage, the NAND circuit 88 is validated to drive the transistors 38 and 36 instead of the transistors 18 and 16. In this case, the route for connecting the supply voltage VDC upon charging the voltage boosting capacitors 21 to 23 is switched, thereby the resistance value is switched.

In other words, when the supply voltage VDC is higher than the predetermined voltage and the level of the voltage for charging the voltage boosting capacitors 21 to 23 is high, the transistors 38 and 36 having a large on-resistance respectively are driven, thereby the charging current of the voltage boosting capacitors 21 to 23 is limited. Consequently, it is avoided that the current flow in the subject voltage boosting circuit changes abruptly. The supply voltage VDC is thus prevented from significant changes. When the supply voltage VDC is lower than the predetermined voltage and the level of the voltage for charging the voltage boosting capacitors 21 to 23 is low, the transistors 18 and 16 having a small on-resistance respectively are driven and the charging current is not limited. Consequently, when the charging current at the start of charging is comparatively less, no current limitation is made and the performance is not degraded.

As described above, the power supply circuit in this embodiment includes newly added charging switches (transistors); this is different in configuration from the power supply circuit in the fourth embodiment. Each of the switches has on-resistance to be switched in accordance with the level of the supply voltage VDC. In the power supply circuit configured in such a way, a high on-resistance switch (transistor 36/38) is selected for a high supply voltage VDC that might cause a fluctuation due to a charging current at the start of charging, thereby the charging current is suppressed while a low on-resistance switch (transistor 16/18) is selected for a low supply voltage VDC that will not cause any fluctuation, since the charging current at the start of charging is small, thereby the charging performance is assured.

Figure 23:
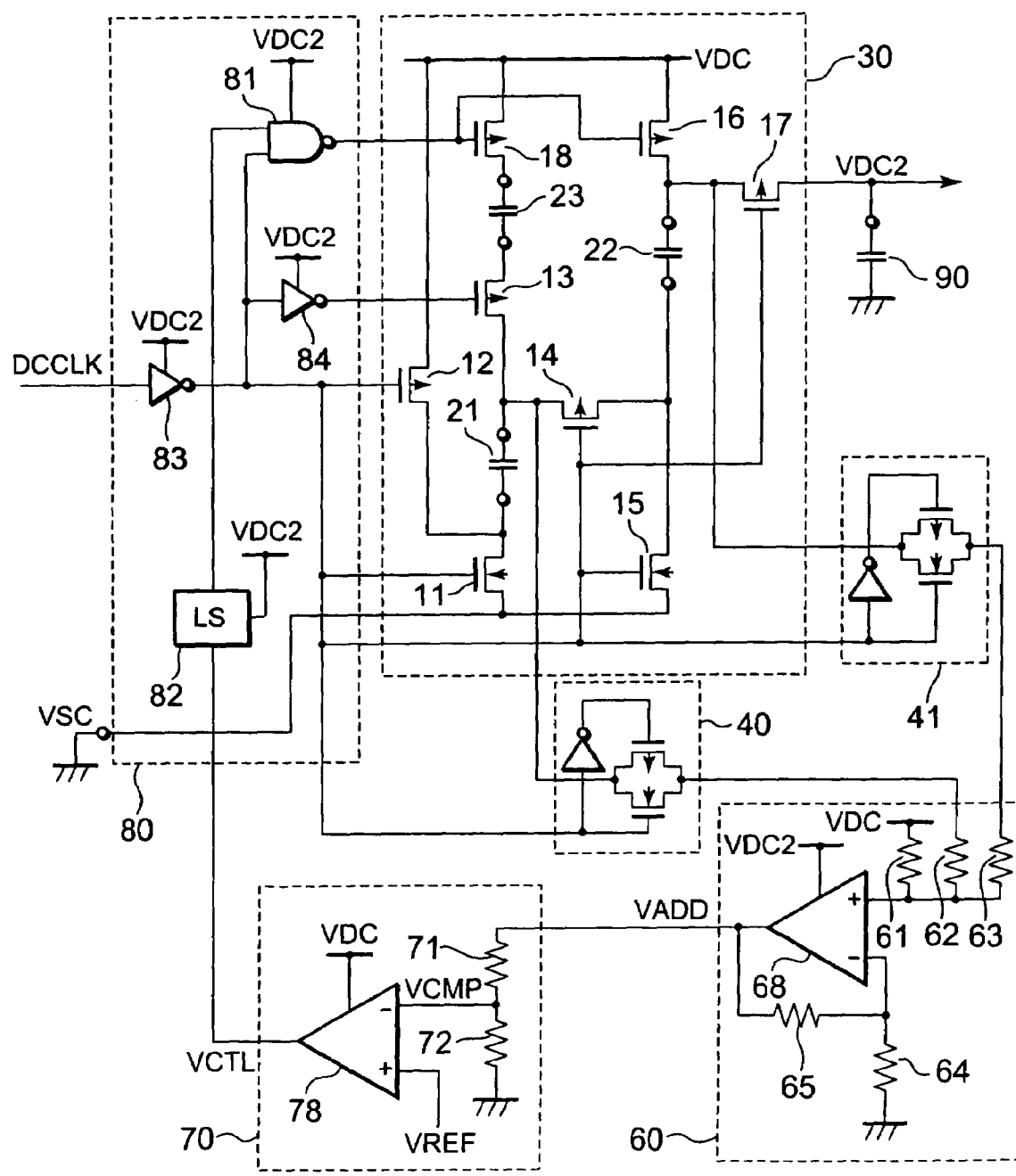
FIG. 23 is a circuit diagram of a power supply circuit in a ninth embodiment of the present invention.

FIG. 23 shows a circuit diagram of a power supply circuit in a ninth exemplary embodiment. This power supply circuit includes a voltage boosting circuit 30, an addition circuit 60, a comparison circuit 70, a control circuit 80, transfer gates 40 and 41, and a smoothing capacitor 90. The power supply circuit supplies an output voltage VDC2 to a load circuit (not shown).

The voltage boosting circuit 30 includes transistors 11 to 18, as well as voltage boosting capacitors 21 to 23. The transistors 11, 13, and 18 are switches for connecting the voltage boosting capacitors 21 and 23 to each other serially, thereby charging those capacitors 21 and 23 by applying a supply voltage VDC thereto. The transistor 12 is a switch for connecting the supply voltage VDC serially to the voltage boosting capacitor 21, thereby boosting the charge therein. The transfer gate 40 includes two transistors and a NOT circuit. The transfer gate 40 is a switch for extracting the voltage VC1 from the voltage boosting capacitor 21 that is being charged. The transistors 15 and 16 are switches for charging the voltage boosting capacitor 22 by applying the supply voltage VDC thereto. The transistor 14 is a switch for connecting the voltage boosting capacitor 21 serially to the voltage boosting capacitor 22, thereby boosting the charge in the voltage boosting capacitor 22 with the charging voltage VC1 of the voltage boosting capacitor 21 and the supply voltage VDC. The transistor 17 is a switch for discharging the charge from the voltage boosting capacitor 22 and supplying an output voltage VDC2 to the smoothing capacitor 90. The transfer gate 41 includes two transistors and a NOT circuit and functions as a switch for extracting the VDC2 from the voltage boosting capacitor 22 that is being charged. The sources of the transistors 11 and 15 are not connected to a common line VSS in a circuit for supplying a ground voltage GND, but connected directly to an independent line VSC, away from the common line VSS, for supplying the ground voltage GND. In other words, the ground voltage of the voltage boosting circuit 30 is separated from the ground voltage of the common line VSS and connected to the ground voltage of the independent line VSC. Consequently, the ground voltage VSS of each of the comparison circuit 70, the addition circuit 60, and the control circuit 80 is not affected from the current flowing in the voltage boosting circuit 30, thereby the ground voltage VSS is stabilized.

The addition circuit 60 includes an operation amplifier 68 and resistance elements 61 to 65 and adds up the voltage VC1 of the voltage boosting capacitor 21 extracted through the transfer gate 40, the voltage VC2 of the voltage boosting capacitor 22 extracted through the transfer gate 41, and the supply voltage VDC. The comparison circuit 70 includes a comparator 78 and resistance elements 71 and 72 and compares the output voltage of the addition circuit 60 with a reference voltage VREF. The comparison result is output to the control circuit 80. The control circuit 80 includes a NAND circuit 81, a level shift circuit 82, and NOT circuits 83 and 84. The control circuit 80 controls the on/off state of each of the transistors (switches) and the transfer gates 40 and 41 of the voltage boosting circuit 30 according to the voltage boosting clock DCCLK and the comparison results of the comparison circuit 70.

The output of the voltage boosting circuit 30 is smoothed by the smoothing capacitor 90 and the result is supplied to the load circuit. The smoothed voltage VDC2 is also supplied to the NAND circuit 81, the level shift circuit 82, and the NOT circuits 83 and 84 of the control circuit 80, as well as the operation amplifier 68 of the addition circuit 60, etc.

Next, there will be described the operation of the power supply circuit in the ninth exemplary embodiment. The operation of each part in the power supply circuit is the same as that in the power supply circuit in the fourth embodiment.

At first, the output level of the comparison circuit 70 is assumed to be high. Then, when the level of the voltage boosting clock DCCLK is low, the NOT circuit 83 outputs a high level signal and the NAND circuit 81 outputs a low level signal, thereby the transistors 11, 13, 15, 16, and 18 are turned on and the transistors 12, 14, and 17 are turned off. Consequently, the voltage boosting capacitors 21 and 23 connected to each other serially through the transistor 13 are supplied a supply voltage VDC through the transistors 11 and 18 to be charged respectively. The voltage boosting capacitors 21 and 23 are charged up to a voltage of ½ of the supply voltage VDC respectively. At this time, the charging current flows to the ground voltage GND through the independent line VSC from the source of the transistor 11. The voltage boosting capacitor 22 is supplied the supply voltage VDC through the transistors 15 and 16 to be charged up to the VDC. At this time, the charging current flows from the source of the transistor 15 to the ground voltage GND through the independent line VSC.

At this time, the transfer gates 40 and 41 are on and outputs the voltages VC1 and VC2 of the voltage boosting capacitors 21 and 22 that are being charged respectively to the addition circuit 60. The addition circuit 60 then adds up the charging voltage VC1 of the voltage boosting capacitor 21, the charging voltage VC2 of the voltage boosting capacitor 22, and the supply voltage VDC and outputs the output voltage VADD to the comparison circuit 70. In the comparison circuit 70, each of the resistance elements 71 and 72 divides the output voltage VADD and the comparison circuit 70 compares each divided voltage VADD with the reference voltage VREF and outputs the comparison result to the control circuit 80. As described in the third embodiment, the control circuit 80 also controls the on/off state of each of the transistors 16 and 18 according to the comparison result and adjusts the charging voltages VC1 and VC2 so that the output voltage VDC2 reaches a desired voltage.

When the level of the voltage boosting clock DCCLK is high, the voltage boosting capacitors 21 and 22 are connected to each other serially through the transistor 14, thereby a voltage (supply voltage VDC+charging voltages VC1 and VC2) is supplied to the smoothing capacitor 90 through the transistor 17.

Figure 24A:
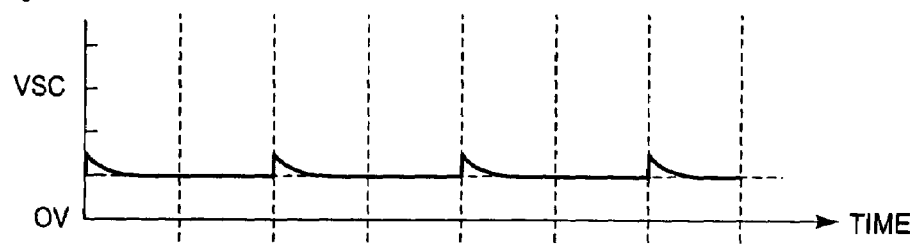
FIGS. 24A to 24C are diagrams for showing an example of the ground voltage VSS at the time of charging in the ninth embodiment of the present invention.
Figure 24B:
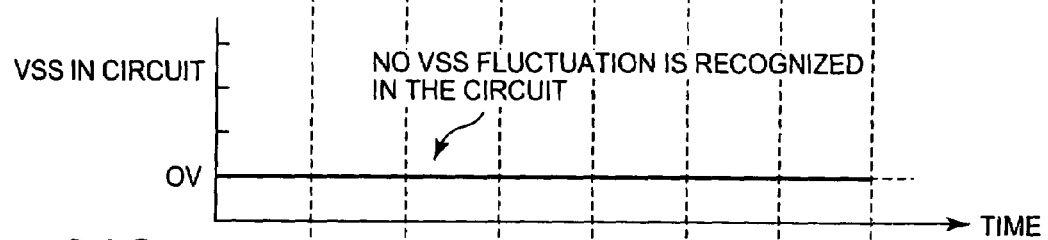
Figure 24C:
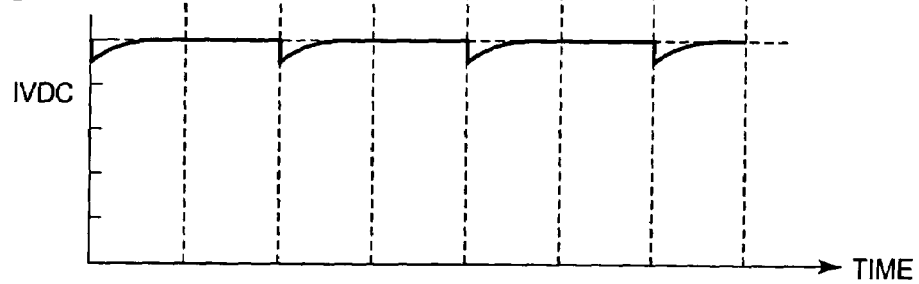

In such a way, the charging current flows from the sources of the transistors 11 and 15 to the independent line VSC upon charging the voltage boosting capacitors 21 to 23. Therefore, as shown in FIGS. 24A to 24C, no fluctuation occurs in the voltage of the common line VSS while the fluctuation might otherwise occurs due to a charging current. In other words, in this embodiment, the sources of the switches (transistors 11 and 15) provided in the charging route are separated from the common line VSS and connected to the independent line VSC, thereby the voltage of the common line VSS is prevented from fluctuation that might otherwise occur due to a charging current and the display quality of the liquid crystal display apparatus is prevented from degradation.

As described above, if high performance is required, then a predetermined resistance element is inserted only at the voltage supply side of the subject charging switch, thereby minimizing the lowering of the performance while the charging current is limited. Otherwise, switching is made between a low on-resistance switch and a high on-resistance switch in accordance with the level of the supply voltage VDC, thereby limiting the charging current in accordance with the level of the supply voltage VDC. If the charging current is limited in such a way, it is possible to suppress the fluctuation of the supply voltage VDC that might otherwise occur due to a charging current at the start of charging. Consequently, the display quality can be prevented from degradation such as horizontal stripes to appear on the screen. Furthermore, the source of each switch (transistor) at the low potential side of the charging channel capacitor is separated from the common line VSS and connected to the independent line VSC in the subject circuit, thereby it is possible to eliminate the fluctuation of the voltage in the common line VSS, which might otherwise occur due to a charging current in the subject circuit. Thus the display quality is prevented from degradation such as horizontal stripes to appear on the screen. The present invention is not limited only to the embodiment described above; it is to be understood that modifications will be apparent to those skilled in the art without departing from the spirit of the invention.

Further, it is noted that, Applicant's intent is to encompass equivalents of all claim elements, even if amended later during prosecution.

What is claimed is:

1. A voltage boosting power supply circuit, comprising:
   an output node which outputs an output voltage to a load circuit;
   a voltage boosting capacitor;
   a first switch which applies a first voltage to said voltage boosting capacitor, to charge said voltage boosting capacitor;
   a second switch which connects a second voltage serially to said voltage boosting capacitor to boost a charging voltage of said voltage boosting capacitor;
   a third switch which discharges a boosted charging voltage of said voltage boosting capacitor, an end of said third switch being coupled between said voltage boosting capacitor and said first switch, another end of said third switch being coupled to said output node;
   an extraction switch which has one end coupled between said voltage boosting capacitor and the third switch, and is controlled according to charging said voltage boosting capacitor to extract said charging voltage of said voltage boosting capacitor;
   an addition comparison circuit which couples to another end of said extraction switch, and compares, a sum of said charging voltage of said voltage boosting capacitor and said second voltage, with a predetermined threshold value to generate a result of said comparison; and
   a control circuit which controls an on/off state of said first switch according to said result of comparison during said charging said voltage boosting capacitor.

2. The voltage boosting power supply circuit according to claim 1,
   wherein said control circuit controls said on/off states of said first and second switches so that charging and discharging of said voltage boosting capacitor is alternated repetitively synchronously with a voltage boosting clock; and
   wherein said control circuit, when said sum exceeds said predetermined threshold value, stops said charging by controlling said first switch.

3. The voltage boosting power supply circuit according to claim 1, wherein said addition comparison circuit includes:
   an addition circuit which couples to said another end of said extraction switch, and adds up said charging voltage of said voltage boosting capacitor and said second voltage to generate said result of said addition;
   a comparison circuit which compares said result of addition with said predetermined threshold value to generate said result of said comparison.

4. The voltage boosting power supply circuit according to claim 1,
   wherein an input terminal of said addition comparison circuit couples between said third switch and said output node, and
   wherein said addition comparison circuit further adds up said boosted charging voltage while said voltage boosting capacitor is charged and compares a result of said addition with said predetermined threshold voltage.

5. The voltage boosting power supply circuit according to claim 4, further comprising:
   a second voltage boosting capacitor;
   a fourth switch which applies said first voltage to said second voltage boosting capacitor, to charge said second voltage boosting capacitor;
   a fifth switch which connects a third voltage serially to said second voltage boosting capacitor that is already charged, thereby boosting a voltage of said second voltage boosting capacitor; and
   a second extraction switch which extracts the voltage of said second voltage boosting capacitor that is being charged,
   wherein said second voltage boosting capacitor having a voltage already boosted outputs said second voltage through said second switch, and
   wherein said addition comparison circuit compares a sum of said voltage of said voltage boosting capacitor that is being charged, said voltage of said second voltage boosting capacitor that is being charged, and said third voltage, with a predetermined threshold value.

6. The voltage boosting power supply circuit according to claim 5, further comprising:
   a third voltage boosting capacitor;
   a sixth switch which applies said first voltage to said third voltage boosting capacitor while said voltage boosting capacitor is discharged, thereby charging said third voltage boosting capacitor;
   a seventh switch which connects said second voltage serially to said third voltage boosting capacitor that is already charged, thereby boosting said third voltage boosting capacitor; and
   a third extraction switch which extracts said voltage of said third voltage boosting capacitor that is being charged, and wherein said addition comparison circuit compares a sum of said voltage of said voltage boosting capacitor or said third voltage boosting capacitor, whichever is being charged, and said second voltage, with said predetermined threshold value, and outputs a result of said comparison.

7. A liquid crystal display panel driving apparatus, comprising:
   a voltage boosting power supply circuit according to claim 1; and
   a display control unit for supplying a voltage boosting clock synchronizing with a display clock to said voltage boosting power supply circuit.

8. The voltage boosting power supply circuit as claimed in claim 1, further comprising: a resistance element which supplies a voltage to said voltage boosting capacitor and limits a charging current upon charging said voltage boosting capacitor.

9. The voltage boosting power supply circuit as claimed in claim 8, wherein said resistance element is provided between said first switch and said voltage boosting capacitor.

10. The voltage boosting power supply circuit according to claim 8, wherein said resistance element comprises an on-resistance assumed when said first switch is turned on and limits said charging current upon charging said voltage boosting capacitor.

11. The voltage boosting power supply circuit according to claim 8, further comprising a second comparison circuit which compares said first voltage with a predetermined threshold value, and outputs a second comparison result, and
   wherein said power supply circuit changes a resistance value of said resistance element according to said second comparison result.

12. The voltage boosting power supply circuit according to claim 11,
   wherein said resistance element includes a first resistor and a second resistor, and
   wherein said power supply circuit changes the resistance value of said resistor element by switching between said first resistor and said second resistor according to said second comparison result.

13. The voltage boosting power supply circuit according to claim 12,
   wherein said first switch includes a first transistor and a second transistor, each having an on-resistance value that differs between said first and second transistors, and
   wherein said first resistor comprises an on-resistance for said first transistor, and said second resistor comprises an on-resistance for said second transistor.

14. The voltage boosting power supply circuit according to claim 8, wherein a node provided at a ground side of said voltage boosting capacitor is grounded through an independent line separated from a common line provided in a circuit for supplying a ground voltage.

15. The voltage boosting power supply circuit according to claim 1, wherein said predetermined threshold value comprises a voltage corresponding to said first voltage.

16. A boosted voltage control method, comprising:
   outputting an output voltage from an output node to a load circuit;
   applying a first voltage to a voltage boosting capacitor, to charge said capacitor;
   connecting a second voltage serially to said voltage boosting capacitor that is already charged, to boost a charging voltage of said voltage boosting capacitor;
   discharging a boosted charging voltage of said voltage boosting capacitor;
   extracting said charging voltage of said voltage boosting capacitor based on the charging of said voltage boosting capacitor;
   adding up a voltage of said voltage boosting capacitor and said second voltage, during charging said voltage boosting capacitor;
   comparing a result of addition with a predetermined threshold value, during charging said voltage boosting capacitor; and
   stopping charging of said voltage boosting capacitor according to a result of comparison.

17. The boosted voltage control method according to claim 16,
   wherein said charging and said connecting are repeated alternately synchronously with a voltage boosting clock inputted externally, and
   wherein said stopping includes stopping charging of said voltage boosting capacitor when said result of addition exceeds said predetermined threshold value in said charging.

18. The boosted voltage control method according to claim 16, further comprising extracting said voltage of said voltage boosting capacitor that is being charged.

19. The boosted voltage control method according to claim 16, further comprising:
   discharging a charge from said voltage boosting capacitor having a voltage already boosted; and
   extracting an output voltage of said voltage boosting capacitor upon discharging,
   wherein said adding includes adding up said output voltage while said voltage boosting capacitor is being charged.

20. The boosted voltage control method according to claim 16, further comprising:
   applying said first voltage to a second voltage boosting capacitor, thereby charging said second voltage boosting capacitor;
   connecting a third voltage serially to said second voltage boosting capacitor that is already charged, thereby boosting the voltage of said second capacitor; and
   outputting said voltage of said second voltage boosting capacitor having a voltage already boosted as said second voltage,
   wherein said adding includes adding said voltage of said voltage boosting capacitor that is being charged, said voltage of said second voltage boosting capacitor that is being charged, and said third voltage, and outputting a result of said addition.

21. The boosted voltage control method according to claim 20, further comprising:
   applying said first voltage to a third voltage boosting capacitor upon discharging said voltage boosting capacitor, thereby charging said third voltage boosting capacitor;
   connecting said second voltage serially to said third voltage boosting capacitor that is already charged, thereby boosting the voltage of said third voltage boosting capacitor; and
   extracting said voltage from said third voltage boosting capacitor that is being charged,
   wherein said adding includes adding up said voltage of said voltage boosting capacitor or said third voltage boosting capacitor, whichever is being charged, and said second voltage, and outputting a result of said addition.

22. The boosted voltage control method as claimed in claim 16, wherein said first voltage is applied through a resistance element to said voltage boosting capacitor.

23. The boosted voltage control method according to claim 22, further comprising:

comparing said first voltage with said predetermined second threshold value, then outputting a result of said comparison, wherein said charging includes changing a resistance value of said resistance element according to said result of second comparison.

24. The boosted voltage control method according to claim 23, wherein said resistance element includes a first resistor and a second resistor, and wherein said charging includes changing said resistance value of said resistance element by switching between said first resistor and said second resistor according to said second comparison result.

25. The boosted voltage control method according to claim 22, further comprising grounding a node provided at the ground side of a voltage boosting capacitor through an independent line separated from a common line provided in a circuit for supplying a ground voltage.

26. A voltage boosting power supply circuit, comprising:

means for outputting an output voltage from an output node to a load circuit;

means for applying a first voltage to a voltage boosting capacitor, to charge said capacitor;

means for connecting a second voltage serially to said voltage boosting capacitor that is already charged, to boost a charging voltage of said voltage boosting capacitor;

means for discharging a boosted charging voltage of said voltage boosting capacitor;

means for extracting said charging voltage of said voltage boosting capacitor based on the charging of said voltage boosting capacitor;

means for, during charging said voltage boosting capacitor, comparing a sum of the voltage of said voltage boosting capacitor and said second voltage, with a predetermined threshold value, and outputting a result of said comparison; and means for controlling an on/off state of said means for applying according to said result of comparison during said charging said voltage boosting capacitor.

27. The voltage boosting power supply circuit as claimed in claim 26, further comprising means for resisting a charging current upon charging said voltage boosting capacitor.

* * * * *